(12) United States Patent
Hino et al.

(10) Patent No.: US 9,213,199 B2
(45) Date of Patent: Dec. 15, 2015

(54) LIQUID CRYSTAL DISPLAY DEVICE AND METHOD FOR MANUFACTURING SAME

(71) Applicants: DAI NIPPON PRINTING CO., LTD., Tokyo-to (JP); NICHIA CORPORATION, Anan-shi, Tokushima-ken (JP)

(72) Inventors: Kazuyuki Hino, Tokyo-to (JP); Seiji Tawaraya, Tokyo-to (JP); Atsushi Yamamoto, Komatsushima (JP); Tomokazu Yoshida, Anan (JP); Saiki Yamamoto, Tokushima (JP)

(73) Assignees: DAI NIPPON PRINTING CO., LTD., Tokyo-to (JP); NICHIA CORPORATION, Anan-shi, Tokushima-ken (JP)

( * ) Notice: Subject to any disclaimer, the term of this patent is extended or adjusted under 35 U.S.C. 154(b) by 0 days.

(21) Appl. No.: 14/659,897

(22) Filed: Mar. 17, 2015

(65) Prior Publication Data
US 2015/0268492 A1   Sep. 24, 2015

(30) Foreign Application Priority Data

Mar. 19, 2014 (JP) ................................. 2014-057212

(51) Int. Cl.
G02F 1/1335   (2006.01)

(52) U.S. Cl.
CPC ........ *G02F 1/1336* (2013.01); *G02F 1/133514* (2013.01); *G02F 1/133516* (2013.01); *G02F 2001/133614* (2013.01)

(58) Field of Classification Search
CPC ............ G02F 1/1336; G02F 1/133614; G02F 1/133514; G02F 1/133515; G02B 5/223; G03F 7/0007

USPC ............................ 430/7; 349/61, 106; 445/24
See application file for complete search history.

(56) References Cited

U.S. PATENT DOCUMENTS

| 5,232,634 | A | 8/1993 | Sawada et al. |
| 6,509,125 | B1 | 1/2003 | Ito et al. |

(Continued)

FOREIGN PATENT DOCUMENTS

| JP | 02-144502 A | 6/1990 |
| JP | 08-094826 A | 4/1996 |

(Continued)

OTHER PUBLICATIONS

Computer-generated translation of JP 2011-059673 (Mar. 2011).*

(Continued)

*Primary Examiner* — John A McPherson
(74) *Attorney, Agent, or Firm* — Ladas & Parry LLP

(57) ABSTRACT

Provided is a liquid crystal display device which exhibits power saving property and high display quality and is capable of suppressing the time-dependent degradation in display quality. The above problem is solved by providing a liquid crystal display device comprising a liquid crystal cell unit including a color filter having a transparent substrate and a plurality of coloring layers formed on the transparent substrate, a counter substrate and a liquid crystal layer formed between the color filter and the counter substrate and a backlight unit including a light emitting device having a blue light emitting element, and a red fluorescent substance and a green fluorescent substance, and the plurality of coloring layers has a blue coloring layer containing a color material of a specific triarylmethane-based compound and the red fluorescent substance is a surface-treated $M^1{}_2[M^2{}_{1-x}Mn^{4+}{}_xF_6]$ (for example, $M^1$ represents $K^+$ and $M^2$ represents Si).

10 Claims, 2 Drawing Sheets

(56) References Cited

U.S. PATENT DOCUMENTS

| | | |
|---|---|---|
| 2006/0169986 A1 | 8/2006 | Radkov et al. |
| 2008/0212305 A1 | 9/2008 | Kawana et al. |
| 2010/0091215 A1 | 4/2010 | Fukunaga et al. |
| 2010/0142189 A1 | 6/2010 | Hong et al. |
| 2010/0271578 A1* | 10/2010 | Ohkuma .............. G03F 7/0007 349/106 |
| 2011/0049444 A1 | 3/2011 | Sako et al. |
| 2013/0018198 A1* | 1/2013 | Kondou .................. C09B 11/12 556/14 |
| 2013/0271960 A1 | 10/2013 | Hong et al. |
| 2014/0037866 A1 | 2/2014 | Okada |

FOREIGN PATENT DOCUMENTS

| | | |
|---|---|---|
| JP | 08-327812 A | 12/1996 |
| JP | 08-327998 A | 12/1996 |
| JP | 11-223720 A | 8/1999 |
| JP | 2000-162429 A | 6/2000 |
| JP | 2004-307391 A | 11/2004 |
| JP | 2006-47975 A | 2/2006 |
| JP | 2008-004766 A | 1/2008 |
| JP | 2009-528429 A | 8/2009 |
| JP | 2009-212508 A | 9/2009 |
| JP | 2010-093132 A | 4/2010 |
| JP | 2010-209311 A | 9/2010 |
| JP | 2011-007847 A | 1/2011 |
| JP | 2011-012091 A | 1/2011 |
| JP | 2011 059673 A * | 3/2011 |
| JP | 2013-57053 A | 3/2013 |
| JP | 2013-242522 A | 12/2013 |
| JP | 2014-108975 A | 6/2014 |
| WO | 2009/107734 A1 | 9/2009 |

OTHER PUBLICATIONS

A.G. Paulusz; "Efficient Mn(IV) Emission in Fluorine Coordination", J. Electrochem. Soc. vol. 120; No. 7, Jul. 1973; pp. 942-947.

* cited by examiner

LIQUID CRYSTAL DISPLAY DEVICE AND METHOD FOR MANUFACTURING SAME

TECHNICAL FIELD

The present invention relates to a liquid crystal display device which exhibits favorable power saving properties and display quality and a method for manufacturing the same.

BACKGROUND ART

In recent years, the demand for a liquid crystal display device has increased in association with the development of a personal computer, especially a portable personal computer. In addition, the market of liquid crystal display device has recently expanded more and more as the ownership rate of the household liquid crystal television has also increased and a smartphone and a tablet terminal have been widely spread.

Such a liquid crystal display device generally includes a liquid crystal cell unit equipped with a color filter, a counter substrate and a liquid crystal layer sandwiched therebetween and further a light source called backlight.

In recent years, a liquid crystal display device is strongly required to have a power saving function. In addition, a liquid crystal display device is required to have higher display quality, specifically, high contrast and high color reproducibility.

To cope with the requests for a liquid crystal display device describe above, for example, it has been investigated to use a white LED light source instead of a light source using a cold-cathode tube of the related art in the backlight, and the proposal has been partially put to practical use. The white LED light source has advantages such as a long life, high efficiency and power saving.

As the white LED light source; those having an aspect in which a blue LED and a yellow fluorescent substance are combined have been put to practical use, but those having an aspect in which a blue LED, a red fluorescent substance and a green fluorescent substance are combined are required from the viewpoint of high color rendering property and color reproducibility of liquid crystal display (Japanese Patent Application Laid-open (JP-A) No. 2010-093132). In addition, it is disclosed in JP-A No. 2010-093132 that it is possible to obtain a semiconductor light emitting device capable of imparting favorable color reproducibility in a case in which a fluorescent substance using $Mn^{4+}$ doped $K_2MF_6$ (M=Si, Ge or Ti) as a red fluorescent substance and Eu-doped β-sialon fluorescent substance as a green fluorescent substance are used as the backlight source of a liquid crystal display device.

In addition, for example, the color filter is required to have higher brightness in order to increase the utilization efficiency of the backlight. It is disclosed, for example, in JP-A No. 2008-004766, JP-A No. 2011-007847, WO 2009/107734; JP-A No. 2013-057053, and JP-A No. 2013-242522 that the use of a blue color material constituted by a triarylmethane-based compound makes it possible to increase the transmittance of the blue coloring layer. In addition, it is known that it is possible to increase the transmittance of the green coloring layer by the use of a triarylmethane-based compound or the Pigment Green (hereinafter, abbreviated as PG) 1, PG7, PG36 and PG58 that are classified into the pigment in color index (C.I.; published by The Society of Dyers and Colourists) as the green color material. In addition, it is known that it is possible to increase the transmittance of the red coloring layer by the use of the Pigment Red (hereinafter, abbreviated as PR149, PR177, PR179, PR202, PR207, PR209, PR214, PR242, PR254, PR255 and PR264 and the Pigment Orange 38 as the red color material.

SUMMARY OF INVENTION

Technical Problem

In order to improve the power saving and display quality of a liquid crystal display device, the present inventors studied a liquid crystal display device formed by combining a liquid crystal cell unit equipped with a color filter having a coloring layer using the color material which is regarded to be suitable to increase the brightness in the related art and described above and a backlight unit equipped with the red fluorescent substance and the green fluorescent substance which are regarded to be suitable to increase the color rendering and described above. The liquid crystal display device is able to exhibit favorable color reproducibility in the initial stage. In addition, a favorable result is obtained for the visibility angle property since the film thickness of the color filter coloring layer can be thinned. However, a new problem is caused that the white point shifts to the green direction in the color coordinate with the passage of time and thus it is difficult to maintain the display quality.

Incidentally, the color coordinate refers to the color coordinate of XYZ color system approved as the standard color system by International Commission on Illumination (CIE) in 1931.

The invention has been made in view of the above problems, and a main object thereof is to provide a liquid crystal display device which exhibits power saving property, high color reproducibility and suppressed time-dependent degradation in display quality.

Solution to Problem

The present inventors have performed an intensive research in order to solve the problems described above, and as a result, found out that the shift of the white point to the green direction in the color coordinate described above is greatly influenced by the correlative two factors of the degradation of the color material contained in the blue coloring layer and the degradation of the red fluorescent substance used in the light emitting device among a plurality of factors that degrade the liquid crystal display device. The present inventors who obtained the above finding have further performed an intensive research and found out that the time-dependent degradation in display quality of the liquid crystal display device can be effectively suppressed in the case of using a color filter having a blue coloring layer containing a color material which is represented by General Formula (I) to be described below or General Formula (III) to be described below and favorable in various kinds of durability among the triarylmethane-based compounds and a light emitting device having a red fluorescent substance obtained by subjecting a compound represented by General Formula (II) to be described below to a surface treatment so as to improve durability in combination, thereby completing the invention.

In other words, the invention provides a liquid crystal display device comprising; a liquid crystal cell unit including a color filter having a transparent substrate and a plurality of coloring layers formed on the transparent substrate, a counter substrate and a liquid crystal layer formed between the color filter and the counter substrate; and a backlight unit including a light emitting device having a blue light emitting element, and a red fluorescent substance and a green fluorescent substance, wherein the plurality of coloring layers containing a blue coloring layer containing a color material represented by the following General Formula (I), and the red fluorescent substance is a fluorescent substance that is surface treated and represented by the following General Formula (II):

General Formula (I)

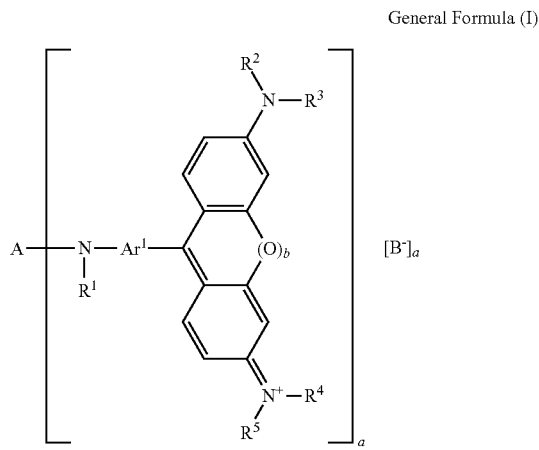

(in General Formula (I), A represents an a-valent organic group of which a carbon atom directly bonded to N does not have a π bond, the organic group represents an aliphatic hydrocarbon group having a saturated aliphatic hydrocarbon group at least at a terminal directly bonded to N or an aromatic group having the aliphatic hydrocarbon group and may contain O, S and N in a carbon chain; B⁻ represents a monovalent anion, and a plurality of B⁻ may be same as or different from one another; $R^1$ to $R^5$ each independently represents a hydrogen atom, an alkyl group which may have a substituent or an aryl group which may have a substituent, and $R^2$ and $R^3$, and $R^4$ and $R^5$ may bond to each other to form a ring structure; $Ar^1$ represents a divalent aromatic group which may have a substituent; a plurality of $R^1$ to $R^5$ and a plurality of $Ar^1$ may be same as or different from one another, respectively; "a" represents an integer from 2 to 4; "b" represents 0 or 1, and there is no bond when "b" is 0; a plurality of "b" may be same as or different from one another), and

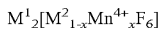 General Formula (II)

(in General Formula (II) above, $M^1$ represents at least one kind selected from the group consisting of $K^+$, $Li^+$, $Na^+$, $Rb^+$, $Cs^+$ and $NH_4^+$, $M^2$ represents at least one kind selected from the group consisting of Group 4 elements and Group 14 elements, and "x" is 0<x<0.2).

In addition, the invention provides a liquid crystal display device comprising; a liquid crystal cell unit including a color filter having a transparent substrate and a plurality of coloring layers formed on the transparent substrate, a counter substrate and a liquid crystal layer formed between the color filter and the counter substrate; and a backlight unit including a light emitting device having a blue light emitting element, and a red fluorescent substance and a green fluorescent substance, wherein the plurality of coloring layers containing a blue coloring layer containing a color material represented by the following General Formula (III) and the red fluorescent substance is a fluorescent substance that is surface treated and represented by the following General Formula (II):

General Formula (III)

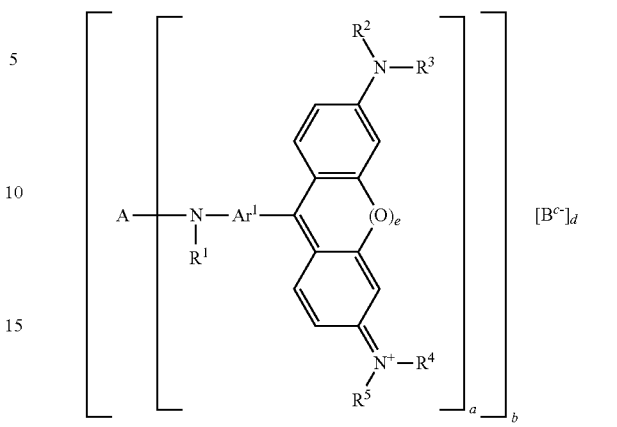

(in General Formula (III), A represents an a-valent organic group of which a carbon atom directly bonded to N does not have a π bond, the organic group represents an aliphatic hydrocarbon group having a saturated aliphatic hydrocarbon group at least at a terminal directly bonded to N or an aromatic group having the aliphatic hydrocarbon group and may contain O, S and N in a carbon chain; $B^{c-}$ represents a c-valent anion; $R^1$ to $R^5$ each independently represents a hydrogen atom, an alkyl group which may have a substituent or an aryl group which may have a substituent, and $R^2$ and $R^3$, and $R^4$ and $R^5$ may bond to each other to form a ring structure; $Ar^1$ represents a divalent aromatic group which may have a substituent; a plurality of $R^1$ to $R^5$ and a plurality of $Ar^1$ may be the same as or different from one another, respectively;

"a" represents an integer from 2 to 4; "c" represents an integer of 2 or more, "b" and "d" represent an integer of 1 or more; "e" represents 0 or 1, and there is no bond when "e" is 0; a plurality of "e" may be same as or different from one another), and

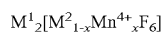 General Formula (II)

(in General Formula (II) above, $M^1$ represents at least one Rind selected from the group consisting of $K^+$, $Li^+$, $Na^+$, $Rb^+$, $Cs^+$ and $NH_4^+$, $M^2$ represents at least one kind selected from the group consisting of Group 4 elements and Group 14 elements, and "x" is 0<x<0.2).

According to the invention, it is possible to obtain, a liquid crystal display device which exhibits power saving property and high display quality and is capable of suppressing the time-dependent degradation in display quality as the blue coloring layer of the color filter in the liquid crystal cell unit contains a color material represented by General Formula (I) above or General Formula (III) above and the red fluorescent substance of the light emitting device in the backlight unit is a fluorescent substance that is surface treated and represented by General Formula (II) above.

In the above invention, it is preferable that the anion in General Formula (III) above be a polyacid anion that contains molybdenum and tungsten and has a molar ratio of molybdenum and tungsten in the range of from 0.4:99.6 to 15:85. In addition, in the above invention, it is preferable that the anion in General Formula (III) above be a polyacid anion that contains at least tungsten and has a molar ratio of molybdenum to tungsten of less than 0.4/99.6. This is because the heat resistance and the light resistance of the color material can be made excellent and thus the time-dependent degradation of the color filter can be suitably suppressed.

In the above invention, it is preferable that an activator agent concentration of the red fluorescent substance be 6 mol % or less. This is because the light resistance of the red fluorescent substance can be improved and thus the time-dependent degradation of the light emitting device can be suitably suppressed.

In the above invention, it is preferable that the light emitting device has a lead frame and is obtained by disposing the red fluorescent substance within 200 μm from a top surface of the lead frame. This is because the heat dissipation path of the red fluorescent substance can be secured and the degradation of the red fluorescent substance can be suppressed, and thus the time-dependent degradation of the light emitting device can be suitably suppressed.

The invention provides a method for manufacturing a liquid crystal display device, which manufactures a liquid crystal display device comprising a liquid crystal cell unit including a color filter having a transparent substrate and a plurality of coloring layers formed on the transparent substrate, a counter substrate and a liquid crystal layer formed between the color filter and the counter substrate, and a backlight unit including a light emitting device having a blue light emitting element, and a red fluorescent substance and a green fluorescent substance, the method comprising steps of: forming the color filter having a blue coloring layer containing a color material represented by the following General Formula (I); and forming the light emitting device in which the red fluorescent substance is a fluorescent substance that, is surface treated and represented by the following General Formula (II):

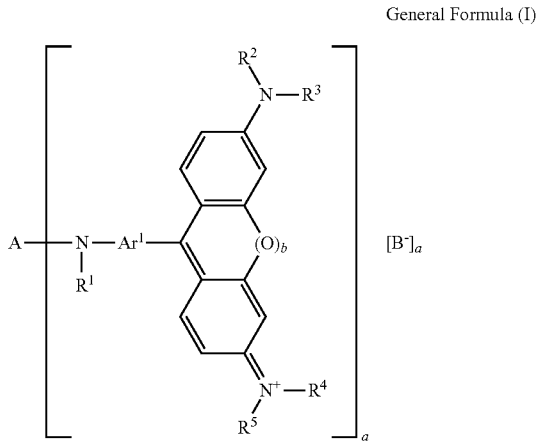

General Formula (I)

(in General Formula (I), A represents an a-valent organic group of which a carbon atom directly bonded to N does not have a π bond, the organic group represents an aliphatic hydrocarbon group having a saturated aliphatic hydrocarbon group at least at a terminal directly bonded to N or an aromatic group having the aliphatic hydrocarbon group and may contain O, S and N in a carbon chain; $B^-$ represents a monovalent anion, and a plurality of $B^-$ may be same as or different from one another; $R^1$ to $R^5$ each independently represents a hydrogen atom, an alkyl group which may have a substituent or an aryl group which may have a substituent, and $R^2$ and $R^3$, and $R^4$ and $R^5$ may bond to each other to form a ring structure; $Ar^1$ represents a divalent aromatic group which may have a substituent; a plurality of $R^1$ to $R^5$ and a plurality of $Ar^1$ may be same as or different from one another, respectively;

"a" represents an integer from 2 to 4; "b" represents 0 or 1, and there is no bond when "b" is 0; a plurality of "b" may be same as or different from one another, and

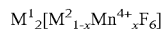
General Formula (II)

(in General Formula (II) above, $M^1$ represents at least one kind selected from the group consisting of $K^+$, $Li^+$, $Na^+$, $Rb^+$, $Cs^+$ and $NH_4^+$, $M^2$ represents at least one kind selected from the group consisting of Group 4 elements and Group 14 elements, and "x" is 0<x<0.2).

The invention provides a method for manufacturing a liquid crystal display device, which manufactures a liquid crystal display device comprising a liquid crystal cell unit including a color filter having a transparent substrate and a plurality of coloring layers formed on the transparent substrate, a counter substrate and a liquid, crystal layer formed between, the color filter and the counter substrate, and a backlight unit including a light emitting device having a blue light emitting element, and a red fluorescent substance and a green fluorescent substance, the method comprising steps of: forming the color filter having a blue coloring layer containing a color material represented by the following General Formula (III); and forming the light emitting device in which the red fluorescent substance is a fluorescent substance that is surface treated and represented by the following General Formula (II):

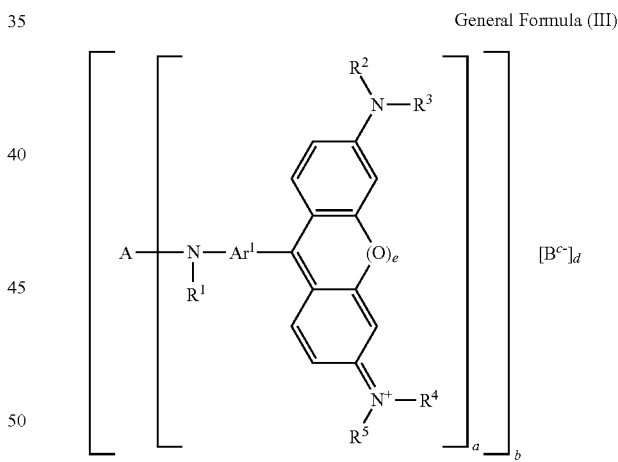

General Formula (III)

(in General Formula (III), A represents an a-valent organic group of which, a carbon atom directly bonded to N does not have a π bond, the organic group represents an aliphatic hydrocarbon group having a saturated aliphatic hydrocarbon group at least at a terminal directly bonded to N or an aromatic group having the aliphatic hydrocarbon group and may contain O, S and N in a carbon chain; $B^{c-}$ represents a c-valent anion; $R^1$ to $R^5$ each independently represents a hydrogen atom, an alkyl group which may have a substituent or an aryl group which may have a substituent, and $R^2$ and $R^3$, and $R^4$ and $R^5$ may bond, to each other to form a ring structure; $Ar^1$ represents a divalent aromatic group which may have a substituent; a plurality of $R^1$ to $R^5$ and a plurality of $Ar^1$ may be same as or different from one another, respectively;

"a" represents an integer from 2 to 4; "c" represents an integer of 2 or more, "b" and "d" represent an integer of 1 or more; "e" represents 0 or 1, and there is no bond when "e" is 0; a plurality of "e" may be same as or different from one another) and

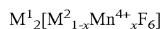  General Formula (II)

(in General Formula (II) above, $M^1$ represents at least one kind selected from the group consisting of $K^+$, $Li^+$, $Na^+$, $Rb^+$, $Cs^+$ and $NH_4^+$, $M^2$ represents at least one kind selected from the group consisting of t Group 4 elements and Group 14 elements, and "x" is 0<x<0.2).

According to the invention, it is possible to obtain a liquid crystal display device which exhibits power saving property and high display quality and is capable of suppressing the time-dependent degradation in display quality by comprising the color filter forming step and the light emitting device forming step.

Advantageous Effects of Invention

The liquid crystal display device of the invention has an effect of exhibiting high power saving property and color reproducibility and being able to suppress the time-dependent degradation in display quality.

DESCRIPTION OF EMBODIMENTS

Figure 1:
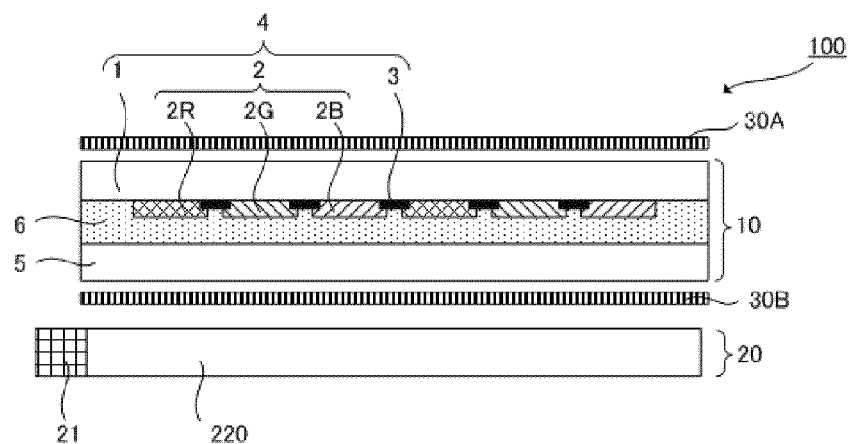
FIG. 1 is a schematic sectional, view illustrating an example of a liquid crystal display device of the invention.

Hereinafter, the liquid crystal display device and the manufacturing method thereof according to the invention will be described in detail.

A. Liquid Crystal Display Device

The liquid crystal display device of the invention is a liquid crystal display device comprising: a liquid crystal cell unit including a color filter having a transparent substrate and a plurality of coloring layers formed on the transparent substrate, a counter substrate and a liquid crystal layer formed between the color filter and the counter substrate, and a backlight unit including a light emitting device having a blue light emitting element, and a red fluorescent substance and a green fluorescent substance, wherein the plurality of coloring layers has a blue coloring layer containing a color material represented by the following General Formula (I) and the red fluorescent substance is a fluorescent substance that is surface treated and represented by the following General Formula (II),

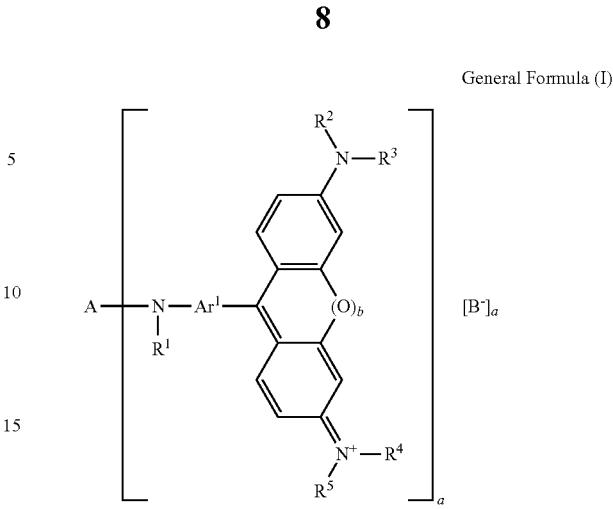

General Formula (I)

(in General Formula (I), A represents an a-valent organic group of which a carbon atom directly bonded to N does not have a π bond, the organic group represents an aliphatic hydrocarbon group having a saturated aliphatic hydrocarbon group at least at a terminal directly bonded to N or an aromatic group having the aliphatic hydrocarbon group and may contain O, S and N in a carbon chain; B⁻ represents a monovalent anion, and a plurality of B⁻ may be the same as or different from, one another; $R^1$ to $R^5$ each independently represents a hydrogen atom, an alkyl group which may nave a substituent or an aryl group which may have a substituent, and $R^2$ and $R^3$, and $R^4$ and $R^5$ may bond to each other to form a ring structure; $Ar^1$ represents a divalent aromatic group which may have a substituent; a plurality of $R^1$ to $R^5$ and a plurality of $Ar^1$ may be the same as or different from one another, respectively;

"a" represents an integer from 2 to 4; "b" represents 0 or 1, and there is no bond when "b" is 0; a plurality of "b" may be the same as or different from one another), and

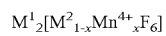  General Formula (II)

(in General Formula (II) above, $M^1$ represents at least one kind selected from the group consisting of $K^+$, $Li^+$, $Na^+$, $Rb^+$, $Cs^+$ and $NH_4^+$, $M^2$ represents at least one kind selected from the group consisting of the Group 4 elements and the Group 14 elements, and "x" is 0<x<0.2).

In addition, the liquid crystal display device of the invention is a liquid crystal display device comprising a liquid crystal cell unit including a color filter having a transparent substrate and a plurality of coloring layers formed on the transparent substrate, a counter substrate and a liquid crystal layer formed between the color filter and the counter substrate, and a backlight unit including a light emitting device having a blue light emitting element, and a red fluorescent substance and a green fluorescent substance, wherein the plurality of coloring layers has a blue coloring layer containing a color material represented by the following General Formula (III) and the red fluorescent substance is a fluorescent substance that is surface treated and represented, by the above General Formula (II), General Formula (III)

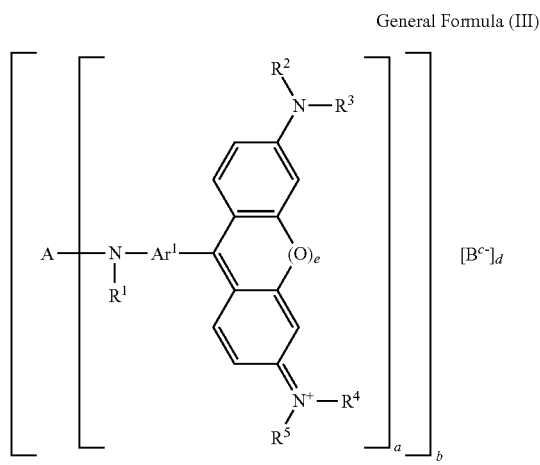

(in General Formula (III), A represents an a-valent organic group of which a carbon atom directly bonded to N does not have a π bond, the organic group represents an aliphatic hydrocarbon group having a saturated aliphatic hydrocarbon group at least at a terminal directly bonded to N or an aromatic group having the aliphatic hydrocarbon group and may contain O, S and N in a carbon chain; $B^{c-}$ represents a c-valent anion; $R^1$ to $R^5$ each independently represents a hydrogen atom, an alkyl group which may nave a substituent or an aryl group which may have a substituent, and $R^2$ and $R^3$, and $R^4$ and $R^5$ may bond to each other to form a ring structure; $Ar^1$ represents a divalent aromatic group which may have a substituent; a plurality of $R^1$ to $R^5$ and a plurality of $Ar^1$ may be the same as or different from one another, respectively;

"a" represents an integer from 2 to 4; "c" represents an integer of 2 or more, "b" and "d" represent an integer of 1 or more; "e" represents 0 or 1, and there is no bond when, "e" is 0; a plurality of "e" may be the same as or different from one another).

In other words, the liquid crystal display device of the invention is characterized in that the blue coloring layer of the color filter in the liquid crystal cell unit contains a color material represented by General Formula (I) above or General Formula (III) above and the red fluorescent substance of the light emitting device in the backlight unit is a fluorescent substance that is surface treated and represented by General Formula (II) above.

The liquid crystal display device of the invention will be described with reference to the accompanying drawings.

FIG. 1 is a schematic sectional view illustrating an example of the liquid crystal display device of the invention. As illustrated in FIG. 1, a liquid crystal display device 100 of the invention comprises: a liquid crystal cell unit 10 including a color filter 4 having a transparent substrate 1, a plurality of coloring layers 2 of a red coloring 2R, a green coloring layer 2G and a blue coloring layer 2B formed on the transparent substrate 1 and a light shielding portion 3 that is formed between the respective coloring layers of 2R, 2G, and 2B and defines a pixel, a counter substrate 5 and a liquid crystal layer 6 formed between the color filter 4 and the counter substrate 5; and a backlight unit 20 including a light emitting device 21 having a blue light emitting element, a red fluorescent substance and a green fluorescent substance and a light guide plate 220. In addition, polarizers 30A and 30B are usually disposed on the surface of the liquid crystal cell unit.

According to the invention, it is possible to obtain a liquid crystal display device which exhibits power saving property and high display quality and is capable of suppressing the time-dependent degradation in display quality as the blue coloring layer of the color filter in the liquid crystal cell unit contains a color material, represented by General Formula (I) or General Formula (III) above and the red fluorescent substance of the light emitting device in the backlight unit is a fluorescent substance that is surface treated and represented by General Formula (II) above.

The liquid crystal display device can exhibit favorable color reproducibility in the initial stage in the case of combining a liquid crystal cell unit including a color filter which has a coloring layer using the color material which is regarded to be suitable to increase the brightness in the related art and described above with a backlight unit including the red fluorescent substance and the green fluorescent substance which are regarded to be suitable to increase the color rendering and described above. However, the white point shifts to the green direction in the color coordinate with the passage of time and thus it is difficult to maintain the display quality. The present inventors studied in order to improve the display quality of the liquid crystal display device.

Here, as the factor of the time-dependent degradation in the color characteristics of the liquid crystal display device, a time-dependent change in the color characteristics of the liquid crystal cell unit and backlight unit constituting the liquid crystal display device may be mentioned. In addition, as the factor of the time-dependent change in the color characteristics of the liquid crystal cell unit, for example, the degradation of the color material contained in the coloring layer of the color filter may be mentioned. In addition, those containing a resin component are often used as the respective members constituting the color filter and the counter substrate used in the liquid crystal cell unit, but the resin component is likely to turn yellow by the time-dependent degradation, and thus this may also be considered as the factor. As specific examples, the degradation of the overcoat layer of the color filter, the degradation of the resin in the coloring layer of the color filter and the like may be mentioned.

In addition, for example, it may also be considered that the liquid crystal contained in the liquid crystal cell unit is degraded, the component of the sealing agent to seal the liquid crystal layer is dissolved in the liquid crystal layer, and the liquid crystal layer is colored. In addition, the abnormal alignment of the liquid crystal due to the degradation of the alignment layer and a change in thickness of the liquid crystal layer due to the compression characteristic change in the columnar spacer may also be considered as a factor of the time-dependent change in the color characteristics of the liquid crystal cell unit.

In addition, as a factor of the time-dependent change in the color characteristics of the backlight unit, the degradation of each of the red fluorescent substance, green fluorescent substance and blue light emitting element of the light emitting device may be mentioned. In addition, the degradation of the resin forming a package or the sealing resin to seal LED or the degradation of the constituent members (light guide plate, diffusion sheet, prism sheet, brightness enhancing film and the like) of the backlight may be considered as the factor.

Furthermore, as a factor of the time-dependent degradation in the color characteristics of the liquid crystal display device, the degradation of the optical member may also be considered, specifically, the degradation of the polarizer, the prism sheet and the diffusion sheet may be considered.

As described above, a plurality of factors may be considered as the factor of the time-dependent degradation in the color characteristics of the liquid crystal display device. In addition, it is not always possible to exert the effect of suppressing the time-dependent degradation in the color characteristics of the entire liquid crystal display device even in a case in which the measures to cope with these individual factors are taken.

The present inventors have performed an intensive research in order to solve the problems described above, and as a result, found out that the shift of the white point to the green direction in the color coordinate described above is caused by the correlation of the shift of the white point to the yellow direction in the color coordinate of the color filter due to the degradation of the color material contained in the blue coloring layer and the shift of the white point to the blue direction in the color coordinate of the backlight due to the degradation of the red fluorescent substance used in the light emitting device among the plurality of factors that degrade the liquid crystal display device.

In addition, the present inventors have found out that the main factor to cause a shift of the white point to the green direction in the color coordinate of the liquid crystal display device is the correlation of the two factors of the degradation of the color material in the blue coloring layer of the color filter that is one member of the liquid crystal cell unit and the degradation of the red fluorescent substance of the light emitting device that is one member of the backlight unit.

The present inventors have further performed an intensive research on the basis of the above findings and found out that the time-dependent degradation in display quality of the liquid crystal display device can be effectively suppressed in the case of using a color filter having a blue coloring layer containing a color material which is represented by General Formula (I) above or General Formula (III) above and favorable in various kinds of durability even among the triarylmethane-based compounds and a light emitting device having a fluorescent substance obtained by subjecting a fluorescent substance represented by General Formula (II) above to a surface treatment so as to improve durability in combination, thereby completing the invention.

Hereinafter, each configuration of the liquid crystal display device of the invention will be described.

I. Liquid Crystal Cell Unit

The liquid crystal cell unit of the invention includes a color filter, a counter substrate and a liquid crystal layer.

1. Color Filter

The color filter according to the invention includes a transparent substrate and a plurality of coloring layers.

1) A Plurality of Coloring Layers

The plurality of coloring layers according to the invention has at least a blue coloring layer. In addition, the plurality of coloring layers usually have a red coloring layer, a green coloring layer and a blue coloring layer.

(A) Blue Coloring Layer

The blue coloring layer used in the invention has two aspects of an aspect containing a color material represented by General Formula (I) above (first aspect) and an aspect containing a color material represented by General Formula (III) above (second aspect). Hereinafter, the blue coloring layer of each aspect will be described.

(a) First Aspect

The blue coloring layer of the first aspect contains a color material represented by General Formula (I) above and usually a binder resin as well.

(i) Color Material

The color material used in the present aspect is a compound represented by the following General Formula (I),

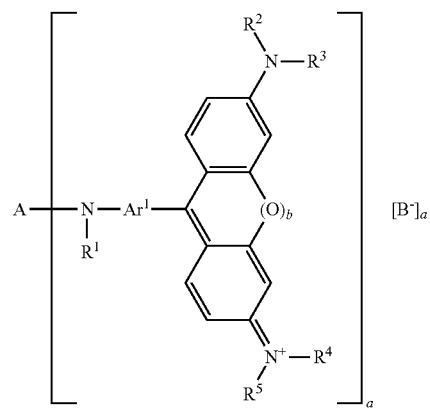

General Formula (I)

(In General Formula (I), A represents an a-valent organic group of which a carbon atom directly bonded to N does not have a $\pi$ bond, the organic group represents an aliphatic hydrocarbon group having a saturated aliphatic hydrocarbon group at least at a terminal directly bonded to N or an aromatic group having the aliphatic hydrocarbon group and may contain O, S and N in a carbon chain. $B^-$ represents a monovalent anion, and a plurality of $B^-$ may be the same as or different from one another. $R^1$ to $R^5$ each independently represents a hydrogen atom, an alkyl group which may have a substituent or an aryl group which may have a substituent, and $R^2$ and $R^3$, and $R^4$ and $R^5$ may bond to each other to form a ring structure. $Ar^1$ represents a divalent aromatic group which may have a substituent. A plurality of $R^1$ to $R^5$ and a plurality of $Ar^1$ may be the same as or different from one another, respectively.

"a" represents an integer from 2 to 4. "b" represents 0 or 1, and there is no bond when "b" is 0. A plurality of "b" may be the same as or different from one another.)

(Cation Moiety)

The cation moiety of the color material used in the present aspect is a di- or higher valent cation having a structure represented, by the following General Formula (IV). The cation moiety represented by General Formula (IV) is different from a triarylmethane-based basic dye or a xanthene-based basic dye of the related art so that even its chloride does not substantially dissolve in water.

The structure represented by General Formula (IV) is a di- or higher valent cation in which the cations including only one triarylmethane skeleton of the related art are linked to one another via a covalent bond of a-valent.

It is possible to consider that the binding species that constitutes a substance obtained through the salt formation of the di- or higher valent cation of the present aspect has a structure including a covalent bond that links the monocations to each other in addition to the ionic bond in a case in which it is considered that the binding species that is constituted by the monocation including only one triarylmethane skeleton of the related art and an anion is only the ionic bond. Hence, it is presumed that the substance obtained through the salt formation of the di- or higher valent cation having a structure represented by the following General Formula (IV) has an additional binding species between, the entire constituents so as to be stronger than the substance obtained through the salt formation of one triarylmethane skeleton of the related art and thus exhibits higher stability and is hardly hydrated. Moreover, it is presumed that the structure represented by the following General Formula (IV) has an increased molecular weight and enhanced the hydrophobic property by the influence of the linking group A and thus does not substantially dissolve in water in cooperation with binding stability.

General Formula (IV)

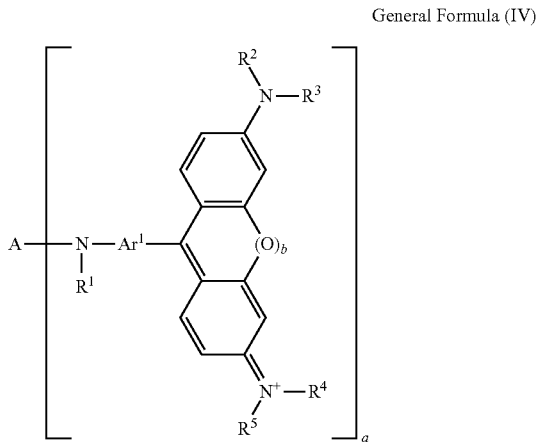

(In General Formula (IV), A, $R^1$ to $R^5$, $Ar^1$, "a" and "b" are the same as those in General Formula (I).)

"b" in General Formula (I) above represents an integer of 0 or 1. The cation moiety has a triarylmethane skeleton represented by the following Chemical Formula (V) in a case in which "b" is 0.

Chemical Formula (V)

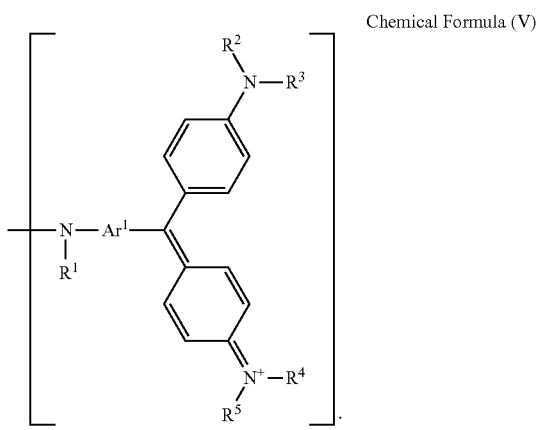

(In Chemical Formula (V), $R^1$ to $R^5$ and $Ar^1$ are the same as those in General Formula (I).)

In addition, the cation moiety has a xanthene skeleton represented by the following Chemical Formula (VI) in a case in which "b" is 1.

Chemical Formula (VI)

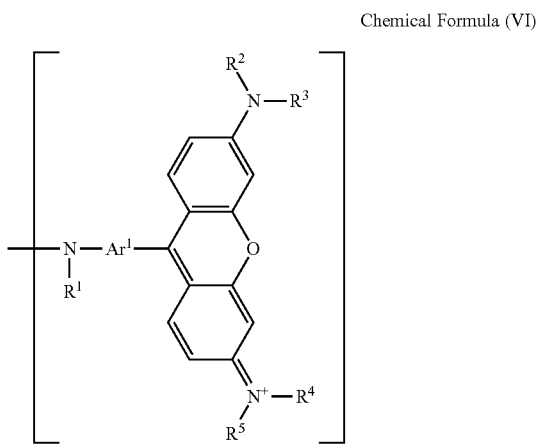

(In Chemical Formula (VI), $R^1$ to $R^5$ and $Ar^1$ are the same as those in General Formula (I).)

The plurality of "b" may be the same as or different from one another. In other words, for example, the cation moiety may have only a plurality of triarylmethane skeleton or only a plurality of xanthene skeleton or may contain both the triarylmethane skeleton and the xanthene skeleton in one molecule. The cation moiety is preferably has only the same skeleton from the viewpoint of color purity. On the other hand, it is possible to adjust the color of the color material of General Formula (I) to the desired color by adopting the cation moiety that contains both the triarylmethane skeleton and the xanthene skeleton and also by the combination of the substituents to be described below.

A in General Formula (I) above is an a-valent organic group of which a carbon atom directly bonded to N (nitrogen atom) does not have a π bond, the organic group represents an aliphatic hydrocarbon group having a saturated aliphatic hydrocarbon group at least at a terminal directly bonded to N or an aromatic group having the aliphatic hydrocarbon group and may contain O (oxygen atom), S (sulfur atom) and N (nitrogen atom) in the carbon chain. The carbon atom directly bonded to N does not have a π bond, and thus the color characteristics of the cationic color developing sits such as color tone or transmittance are not influenced by the linking group A or another color developing site and can retain the same color as a monomer.

In A, an aliphatic hydrocarbon group having a saturated aliphatic hydrocarbon group at least at a terminal directly bonded to N may be any of linear, branched or cyclic, of which a carbon atom other than the terminal carbon atom may have an unsaturated bond, may have a substituent, and may contain O, S and N in a carbon chain as long as the terminal carbon atom directly bonded to N does not have a π bond. For example, a carbonyl group, a carboxyl group, an oxycarbonyl group, an amide group and the like may be contained and a hydrogen atom may be further substituted with a halogen atom and the like.

In addition, in A, an aromatic group having the above aliphatic hydrocarbon group includes a monocyclic or polycyclic aromatic group which has an aliphatic hydrocarbon group having a saturated aliphatic hydrocarbon group at least at a terminal directly bonded to N, may have a substituent, and may be a heterocyclic ring containing O, S, and N.

Among them, it is preferable that A includes a cyclic aliphatic hydrocarbon group or an aromatic group from the viewpoint of robustness of the skeleton.

As the cyclic aliphatic hydrocarbon group, a bridged alicyclic hydrocarbon group is preferable from the viewpoint of robustness of the skeleton among them. The bridged alicyclic hydrocarbon group refers to a polycyclic aliphatic hydrocarbon group having a bridged structure in the aliphatic ring and a polycyclic structure, and examples thereof may include norbornane, bicyclo[2.2.2]octane and adamantane. Norbornane is preferable among the bridged alicyclic hydrocarbon groups. In addition, examples of the aromatic group may include a group containing a benzene ring and a group containing a naphthalene ring, and a group containing a benzene ring is preferable among them.

A represents preferably divalent from the viewpoint of easy availability of the raw materials. Examples of A may include a linear, branched, or cyclic alkylene group having from 1 to 20 carbon atoms or an aromatic group substituted with two alkylene groups having from 1 to 20 carbon atoms such as a xylylene group, for example, in a case in which A represents a divalent organic group.

The alkyl group of $R^1$ to $R^5$ is not particularly limited. Examples thereof may include a linear or branched alkyl group having from 1 to 20 carbon atoms. Among them, it is preferably a linear or branched alkyl group having from 1 to 8 carbon atoms, and it is more preferably a linear or branched alkyl group having from 1 to 5 carbon atoms from the viewpoint of ease of manufacture and raw material procurement. Among them, it is particularly preferable that the alkyl group of $R^1$ to $R^5$ be an ethyl group or a methyl group. The substituent which the alkyl group may have is not particularly limited and examples thereof may include an aryl group, a halogen atom, and a hydroxyl group, and examples of a substituted, alkyl group may include a benzyl group.

The aryl group of $R^1$ to $R^5$ is not particularly limited. Examples thereof may include a phenyl group and a naphthyl group. Examples of the substituent which the aryl group may have may include an alkyl group and a halogen atom.

The fact that $R^2$ and $R^3$, and $R^4$ and $R^5$ are bonded to each other to form a ring structure means that $R^2$ and $R^3$, and $R^4$ and $R^5$ form a ring structure via a nitrogen atom. The ring structure is not particularly limited, and examples thereof may include a pyrrolidine ring, a piperidine ring and a morpholine ring.

Among them, it is preferable that $R^1$ to $R^5$ each independently be a hydrogen atom, an alkyl group having from 1 to 5 carbon atoms, a phenyl group or $R^2$ and $R^3$, and $R^4$ and $R^5$ are bonded to each other to form a pyrrolidine ring, a piperidine ring and a morpholine ring from the viewpoint of chemical stability.

$R^1$ to $R^5$ each independently can take the above structure, but among them, it is preferable that $R^1$ be a hydrogen atom from the viewpoint of color purity, furthermore it is more preferable that all of $R^2$ to $R^5$ be the same from the viewpoint of ease of manufacture and raw material procurement.

The divalent aromatic group of $Ar^1$ is not particularly limited. The aromatic group may be a heterocyclic group in addition to the aromatic hydrocarbon group consisting of a carbon ring. Examples of the aromatic hydrocarbon of the aromatic hydrocarbon group may include a condensed polycyclic aromatic hydrocarbon such as a naphthalene ring, a tetralin ring, an indene ring, a fluorene ring, an anthracene ring and a phenanthrene ring in addition to a benzene ring; and a chain polycyclic hydrocarbon such as biphenyl, terphenyl, diphenylmethane, triphenylmethane and stilbene. The chain polycyclic hydrocarbon may contain O, S and N in the chain skeleton such as diphenyl ether. On the other hand, examples of the heterocyclic ring of the heterocyclic group may include a 5-membered heterocyclic ring such as furan, thiophene, pyrrole, oxazole, thiazole, imidazole and pyrazole; a 6-membered heterocyclic ring such as pyran, pyrone, pyridine, pyridazine, pyrimidine and pyrazine; and a condensed polycyclic heterocyclic ring such as benzofuran, thionaphthene, indole, carbazole, coumarin, benzo-pyrone, quinoline, isoquinoline, acridine, phthalazine, quinazoline and quinoxaline. These aromatic groups may have a substituent.

Examples of the substituent which the aromatic group may have may include an alkyl group having from 1 to 5 carbon atoms and a halogen atom.

$Ar^1$ is preferably an aromatic group having from 6 to 20 carbon atoms and more preferably an aromatic group consisting of a condensed polycyclic carbon ring having from 10 to 14 carbon atoms. Among them, it is more preferably a phenylene group or a naphthylene group from the viewpoint that the structure is simple and the raw material is inexpensive.

The plurality of $R^1$ to $R^5$ and the plurality of $Ar^1$ in one molecule may be the same as or different from one another, respectively. It is preferable that the plurality of $R^1$ to $R^5$ and the plurality of $Ar^1$ be the same as one another, respectively from the viewpoint of color purity since the color developing site exhibits the same color and thus the same color as the single body of the color developing site can be reproduced. On the other hand, it is possible to reproduce the color of a mixture of plural kinds of monomers and thus to adjust the color to the desired color in a case in which at least one of the plurality of $R^1$ to $R^5$ and the plurality of $Ar^1$ is a different substituent.

(Anion Moiety)

The anion moiety in the color material according to the present aspect is a monovalent anion having a structure represented by ($B^-$). It is possible to prepare a color material solution having a high concentration as well since the solubility of the color material in an alcohol-based solvent or a ketone-based solvent is high and to use the color material for dyeing various kinds of substrates as the color material has a monovalent anion.

$B^-$ is not particularly limited as long as it is a monovalent anion, and it may be an organic anion or an inorganic anion. Here, the organic anion refers to an anion which contains at least one carbon atom. In addition, the inorganic anion refers to an anion which does not contain a carbon atom, and examples thereof may include a halide ion such as a fluoride ion, a chloride ion, a bromide ion and an iodide ion, a nitrate ion ($NO^-$) and a perchlorate ion ($ClO_4^-$).

In a case in which $B^-$ is an organic anion, the structure thereof is not particularly limited. Among them, it is preferably an organic group having an anionic substituent.

Examples of the anionic substituent may include an imide acid group such as $-SO_2N^-SO_2CH_3$, $-SO_2N^-COCH_3$, $-SO_2N^-SO_2CF_3$, $-SO_2N^-COCF_3$, $-CF_2SO_2N^-SO_2CH_3$, $-CF_2SO_2N^-COCH_3$, $-CF_2SO_2N^-SO_2CF_3$ and $-CF_2SO_2N^-COCF_3$ or a substituent such as $-SO_3^-$, $-CF_2SO_3^-$, $-COO^-$ and $-CF_2COO^-$.

Among them, an imide acid group or $-SO_3^-$ and $-CF_2SO_3^-$ are preferable and further $-SO_3^-$ (a sulfonate group) is more preferable from the viewpoint of easy availability of the raw materials, manufacturing cost, and a high effect of stabilizing the cation by high acidity and thus maintaining the color-developing state.

The organic group to be substituted with an anionic substituent is not particularly limited. Examples of the organic group may include a linear, branched or cyclic saturated or unsaturated hydrocarbon group, a monocyclic or polycyclic aromatic group and a group formed by combining these. These may contain a hetero atom such as O, S and N in the carbon chain, may contain a carbonyl group, a carboxyl group, an oxycarbonyl group and an amide group, and of which a hydrogen atom may be substituted. Examples of the substituent which the organic group may have may include a halogen atom.

Examples of the organic group to be substituted with an anionic substituent may include a hydrocarbon such as cyclopropane, cyclobutane, cyclopentane, cyclohexane, norbornane, bicyclo[2.2.2]hexane, bicyolo[3.2.3]octane and adamantane; an aromatic compound such as benzene, naphthalene, anthracene, phenanthrene, pyreno, triphenylene, fluorene, furan, thiophene, pyrrole, imidazole, pyran, pyridine, pyrimidine, pyrazine, triazine, indole, purine, quinoline, isoquinoline, xanthene and carbazole. Furthermore the organic group may have a substituent such as a halogen atom and an alkyl group.

Among them, the organic group to be substituted with an anionic substituent is preferably a monocyclic or polycyclic aromatic hydrocarbon group and a group formed by combining these from the viewpoint of easy introduction of the anionic substituent.

It is preferable to use an organic group having the absorption maximum in the wavelength region of 400 nm or less in a case in which no color change by the anion is intended. Examples of the organic group having the absorption maxima in the wavelength region of 400 nm or less may include an organic group consisting of a condensed polycyclic carbon, ring such as naphthalene, tetralin, indene, fluorene, anthracene and phenanthrene; an organic group consisting of a chain polycyclic hydrocarbon such as biphenyl, terphenyl, diphenylmethane, triphenylmethane and stilbene; an organic group consisting of a 5-membered heterocyclic ring such as furan, thiophene, pyrrole, oxazole, thiazole, imidazole and pyrazole; an aromatic compound consisting of a 6-membered heterocyclic ring such as pyran, pyrone, pyridine, pyridazine, pyrimidine and pyrazine; an organic group consisting of a condensed polycyclic heterocyclic ring such as benzofuran, thionaphthene, indole, carbazole, coumarin, benzo-pyrone, quinoline, isoquinoline, acridine, phthalazine, quinazoline and quinoxaline.

In addition, as the organic group to be substituted with an anionic substituent, it is possible to use a skeleton derived from an azo dye, an anthraquinone dye, a triphenylmethane dye, a xanthene dye, a phthalocyanine dye and an indigo dye which are an organic compound or an organic metal compound. Alternatively, it is possible to use an acid dye, a direct dye and an acid mordant dye which are known in the related art.

The color tone of the resulting color material changes and thus the color tone of the color material represented by General Formula (I) above can be adjusted to the desired one in the case of using use a skeleton derived from a dye or an acid dye, a direct dye, an acid, mordant dye and the like.

Among the anions having a skeleton derived from a dye, an anion represented by the following General Formula (VII) is preferable from the viewpoint of improving heat resistance.

It is possible to adjust the color of the color material to the desired color in combination with the cation moiety in the case of using the anion of General Formula (VII) as the anion moiety of the color material.

General Formula (VII)

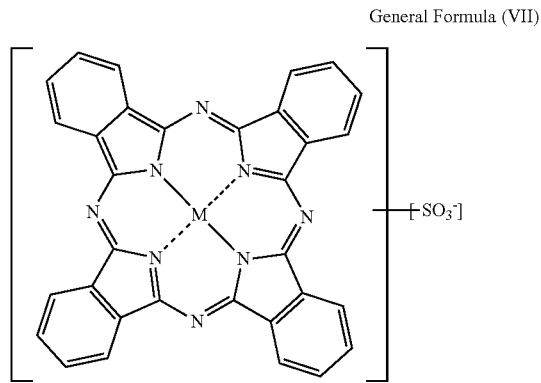

(In General Formula (VII), M represents two hydrogen atoms or Cu, Mg, Al, Ni, Co, Fe or Zn. The sulfonate group ($-SO_3^-$ group) is substituted on the aromatic ring.)

In addition, in the color material according to the present aspect, the above organic anion is preferably an anion represented by the following General Formula (VIII) from the viewpoint of improving heat resistance.

 General Formula (VIII)

(In General Formula (VIII), $Ar^2$ represents a monovalent aromatic group which may have a substituent.)

The produced color material has a characteristic that the unique color of the cation represented by General Formula (I) is likely to be retained since the anion is colorless or pale yellow in the case of using the anion of General Formula (VIII) above as the anion moiety of the color material.

The aromatic group of $Ar^2$ is not particularly limited. The aromatic group may be a heterocyclic ring in addition, to an aromatic hydrocarbon group consisting of a carbon ring. Examples of the aromatic hydrocarbon group may include a condensed polycyclic aromatic hydrocarbon group such as a naphthalene ring, a tetralin ring, an indene ring, a fluorene ring, an anthracene ring and a phenanthrene ring in addition to a benzene ring; and a chain polycyclic hydrocarbon group such as biphenyl, terphenyl, diphenylmethane, triphenylmethane and stilbene. The chain polycyclic hydrocarbon group may have a hetero atom such as O and S in the chain skeleton such as diphenyl ether. On the other hand, examples of the heterocyclic ring in the heterocyclic group may include a 5-membered heterocyclic ring such as furan, thiophene, pyrrole, oxazole, thiazole, imidazole and pyrazole; a 6-membered heterocyclic ring such as pyran, pyrone, pyridine, pyridazine, pyrimidine and pyrazine; and a condensed polycyclic heterocyclic ring such as benzofuran, thionaphthene, indole, carbazole, coumarin, benzo-pyrone, quinoline, isoquinoline, acridine, phthalazine, quinazoline and quinoxaline. These aromatic groups may have a substituent.

Examples of the substituent belonging to the aromatic group may include an alkyl group having from 1 to 5 carbon atoms and a halogen atom.

$Ar^2$ is preferably an aromatic group having from 6 to 20 carbon atoms and more preferably an aromatic group consisting of a condensed polycyclic carbon ring having from 10 to 14 carbon atoms. Among them, it is more preferably a phenylene group or a naphthalene group from the viewpoint that the structure is simple and the raw material is inexpensive.

In the color material, the plurality of anions ($B^-$) may be the same as or different from one another, and an organic anion and an inorganic anion can also be used in combination.

The average particle size of the color material is not particularly limited as long the blue coloring layer can be formed, but it is preferable that the average particle size be within the range of from 10 nm to 300 nm, and among them, within the range of from 20 nm to 200 nm and particularly within the range of from 30 nm to 100 nm.

This is because the color material is easily agglomerated when the average particle size of the color material is small and thus there is a possibility that it is difficult to uniformly disperse the color material in the blue coloring layer. In addition, this is because there is a possibility that it is difficult to form a blue coloring layer having the desired brightness when the average particle size of the color material is too large.

The average particle size of the color material is a dispersed particle size of the color material particles dispersed in a dispersion medium containing at least a solvent and measured by a laser light scattering particle size distribution analyzer. The measurement of particle size by a laser light scattering particle size distribution analyzer can be performed as follows. A blue dispersion obtained by dispersing the above color material is prepared, the blue dispersion is appropriately diluted to a concentration (for example, 1000 times and the like) that is measurable by a laser light scattering particle size distribution analyzer and the particle size is measured at 23° C. by a dynamic light scattering method using a laser light scattering particle size distribution analyzer (for example, a concentrated system particle size analyzer FPAR-1000™).

The average dispersed particle size here is a volume average particle size. The blue dispersion can be prepared using, for example, 3 parts by weight of polysulfonic acid type polymer dispersant and 80 parts by weight of 3-methoxybutyl acetate with respect to 5 parts by weight of the color material.

The content of the color material in the blue coloring layer can be appropriately selected depending on factors such as the application of the liquid crystal display device of the present aspect and is not particularly limited, but it is preferable that the content be within the range of from 5 to 50% by mass, and among them, within the range of from 10 to 40% by mass and particularly within the range of from 15 to 35% by mass.

This is because there is a possibility that the display quality of the liquid crystal display device may deteriorates when the content of the color material is low and it is difficult to form a blue coloring layer itself when the content of the color material is high.

For the method for forming the color material, it is possible to use the method for forming a chloride of a cation moiety described in Japanese Patent No. 5223980 and Japanese Patent No. 5403175.

(ii) Other Materials (Binder Resin)

The blue coloring layer used in the present aspect usually contains a binder resin.

The binder resin used in the present aspect can be the same as to those used in the coloring layer of a general color filter, and examples thereof may include a curable resin and a light sensitive resin. As the binder resin, it is possible to suitably use the cured product of the photosensitive binder component or a curable binder component which is used in the coloring layer resin composition and described, in Japanese Patent No. 5223980 and Japanese Patent No. 5403175.

(Other Components)

The blue coloring layer according to the present aspect usually contains the color material and the binder resin which are described above, and it can contain another component by appropriately selecting if necessary.

Examples of such a component may include an antioxidant. The heat resistance and light resistance of the blue coloring layer can be more favorable as the antioxidant is added. Examples of the antioxidant may include a primary antioxidant having a free radical scavenging function and a secondary antioxidant having a peroxide decomposition function, and either or both of them may be used.

Examples of the primary antioxidant may include 2,6-di-t-butylphenol (molecular weight 206), 2,6-di-t-butyl-p-cresol (molecular weight 220) (trade name: YOSHINOX BHT (manufactured by API Corporation)), 4,4'-butylidenebis(6-t-butyl-3-methylphenol) (molecular weight 383) (trade name: YOSHINOX BB (manufactured by API Corporation)), 2,2'-methylenebis (4-methyl-6-t-butylphenol) (molecular weight 341) (trade name: YOSHINOX 2246G (manufactured by API Corporation)), 2,2'-methylenebis(4-ethyl-6-t-butylphenol) (molecular weight 369) (trade name: YOSHINOX 425 (manufactured by API Corporation)), 2,6-di-t-butyl-4-ethylphenol (molecular weight 234) (trade name: YOSHINOX 250 (manufactured by API Corporation)), 1,1,3-tris(2-methyl-4-hydroxy-5-t-butylphenyl) butane (molecular weight 545) (trade name: YOSHINOX 930 (manufactured by API Corporation)), n-octadecyl-3-(3,5-di-t-butyl-4-hydroxyphenyl)propionate (molecular weight 531) (trade name: TOMINOX SS (manufactured by API Corporation), trade name: IRGANOX 1076 (manufactured by CIBA JAPAN K.K. (CURRENT BASF))), tetrakis [methylene-3-(3,5-di-t-butyl-4-hydroxyphenyl)propionate]methane (molecular weight 1178) (trade name: TOMINOX TT (manufactured by API Corporation), trade name: IRGANOX 1010 (manufactured by CIBA JAPAN K.K. (CURRENT BASF))), triethylene glycol bis[3-(3-t-butyl-4-hydroxy-5-methylphenyl)propionate] (molecular weight 587) (trade name: TOMINOX 917 (manufactured by API Corporation), trade name: IRGANOX 245 (manufactured by CIBA JAPAN K.K. (CURRENT BASE))), tris(3,5-di-t-butyl-4-hydroxybenzyl)isocyanurate (molecular weight 784) (trade name: YOSHINOX 314 (manufactured by API Corporation), trade name: IRQANOX 3114 (manufactured by CIBA JAPAN K.K. (CURRENT BASF))), 3,9-bis [2-[3-(3-t-butyl-4-hydroxy-5-methylphenyl)propionyloxy]-1,1-dimethylethyl]-2,4,8,10-tetraoxaspiro[5,5]-undecane (molecular weight 741) (trade name; Sumilizer GA-80 (manufactured by Sumitomo chemical Co., Ltd.)), 2,2-thiodiethylenebis[3-(3,5-di-t-butyl-4-hydroxyphenyl)propionate] (molecular weight 643) (trade name: IRGANOX 1035 (manufactured by CIBA JAPAN K.K. (CURRENT BASF))), N,N'-hexamethylene-bis(3,5-di-t-butyl-4-hydroxyhydrocinnamide) (molecular weight 637) (trade name: IRGANOX 1098 (manufactured by CIBA JAPAN K.K. (CURRENT BASF))), isooctyl-3-(3,5-di-t-butyl-4-hydroxyphenyl)propionate (molecular weight 391) (trade name: IRGANOX 1135 (manufactured by CIBA JAPAN K.K. (CURRENT BASF))), 1,3,5-trimethyl-2,4,6-tris(3,5-di-t-butyl-4-hydroxybenzyl) benzene (molecular weight 775) (trade name: IRGANOX 1330 (manufactured by CIBA JAPAN K.K. (CURRENT BASF))), 2,4-bis(dodecylthiomethyl)-6-methylphenol (molecular weight 537; (trade name: IRGANOX 1726 (manufactured by CIBA JAPAN K.K. (CURRENT BASF))), a mixture of calcium bis(ethyl 3,5-di-t-butyl-4-hydroxybenzylphosphonate) and polyethylene wax (molecular weight 695) (trade name: IRGANOX 1425 (manufactured by CIBA JAPAN K.K. (CURRENT BASF))), 2,4-bis[(octylthio)methyl]-o-cresol (molecular weight 425) (trade name: IRGANOX 1520 (manufactured by CIBA JAPAN K.K. (CURRENT BASF))), 1,6-hexanediol-bis [3-(3,5-di-t-butyl-4-hydroxyphenyl)propionate] (molecular weight 639) (trade name: IRGANOX 259 (manufactured by CIBA JAPAN K.K. (CURRENT BASF))), 2,4-bis(n-octylthio)-6-(4-hydroxy-3, 5-di-t-butylanilino)-1,3,5-triazine (molecular weight 589) (trade name: IRGANOX 565 (manufactured by CIBA JAPAN K.K. (CURRENT BASF))) and diethyl((3,5-bis(1,1-dimethylethyl)-4-hydroxyphenyl)methyl)phosphonate (molecular weight 356) (trade name: IRGAMOD295 (manufactured by CIBA JAPAN K.K. (CURRENT BASF))).

Examples of the secondary antioxidant may include 6-[3-(3-t-butyl-4-hydroxy-5-methylphenyl)propoxy]-2,4,8,10-tetra-t-butyldibenzo[d,f][1,3,2]dioxaphosphepin (molecular weight 661) (trade name: Sumilizer GP (manufactured by Sumitomo chemical Co., Ltd.)), tris(2,4-di-t-butyl-phenyl) phosphite (molecular weight 647) (trade name: IRGAFOS 168 (manufactured by CIBA JAPAN K.K. (CURRENT BASF))), 2-[[2,4,8,10-tetrakis (1,1-dimethylethyl)dibenzo [d,f][1,3,2]dioxaphosphepin-6-yl]oxy]-N,N-bis[2-[[2,4,8, 10-tetrakis(1,1-dimethylethyl)dibenzo[d,f][1,3,2]dioxaphosphepin-6-yl]oxy]-ethyl]ethanamine (molecular weight 1465) (trade name: IRGAFOS 12 (manufactured by CIBA JAPAN K.K, (CURRENT BASF))), bis(2,4-di-t-butyl-6-methylphenyl)ethyl phosphite (molecular weight 514) (trade name: IRGAFOS 38 (manufactured by CIBA JAPAN K.K. (CURRENT BASF))), dilauryl thiodipropionate (molecular weight 515) (trade name: DLTP "YOSHITOMI" (manufactured by API Corporation), trade name: IRGANOX PS 800 FD (manufactured by CIBA JAPAN K.K. (CURRENT BASF))), distearyl thiodipropionate (molecular weight 683) (trade name: DSTP "YGSHITOMI" (manufactured by API Corporation), trade name: IRGANOX PS 802 FD (manufactured by CIBA JAPAN K.K. (CURRENT BASF))), dimyristyl thiodipropionate (molecular weight 571) (trade name: DMTP "YGSHITOMI" (manufactured by API Corporation), trade name: Sumilizer TPM (manufactured by Sumitomo Chemical Co., Ltd.)), ditridecyl thiodipropionate (molecular weight 543) (trade name: DTTP (manufactured by API Corporation) and pentaerythrityltetrakis(3-lauryl thiopropionate) (molecular weight 1162) (trade name: Sumilizer TP-D (manufactured by Sumitomo Chemical Co., Ltd.)).

The content of the antioxidant in the blue coloring layer can be appropriately selected depending on the kind of antioxidant and is not particularly limited, but it is preferable that the content be, for example, within the range of from 0.001 to 5% by mass, and among them, within the range of from 0.01 to 1% by mass and particularly within the range of from 0.05 to 0.5% by mass, (iii) Others The thickness, arrangement and forming method of the blue coloring layer will be described in the section "(c) a plurality of coloring layers" to be described below, and thus the description thereof is omitted here.

(b) Second Aspect

The blue coloring layer of the second aspect contains a color material represented by General Formula (III) above and usually contains a binder resin as well.

The blue coloring layer of the second aspect has the same configuration as the blue coloring layer of the first aspect except the blue coloring layer of the second aspect contains a color material represented by General Formula (III).

Hereinafter, the color material used in the present aspect will be described.

The color material used in the present aspect is a compound represented by the following General Formula (III).

General Formula (III)

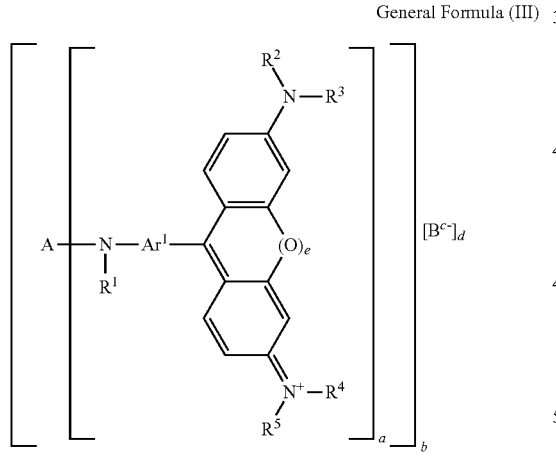

(In General Formula (III), A represents an a-valent organic group of which a carbon atom directly bonded to N does not have a π bond, the organic group represents an aliphatic hydrocarbon group having a saturated aliphatic hydrocarbon group at least at a terminal directly bonded to N or an aromatic group having the aliphatic hydrocarbon, group and may contain O, S and N in a carbon chain, $B^{c-}$ represents a c-valent anion. $R^1$ to $R^5$ each independently represents a hydrogen atom, an alkyl group which may have a substituent or an aryl group which may have a substituent, and $R^2$ and $R^3$, and $R^4$ and $R^5$ may bond to each other to form a ring structure. $Ar^1$ represents a divalent aromatic group which may have a substituent. A plurality of $R^1$ to $R^5$ and a plurality of $Ar^1$ may be the same as or different from one another, respectively.

"a" represents an integer from 2 to 4. "c" represents an integer of 2 or more, "b" and "d" represent an integer of 1 or more. "e" represents 0 or 1, and there is no bond when "e" is 0. A plurality of "e" may be the same as or different from one another.)

The coloring layer of the color filter can have high contrast and can exhibit excellent solvent resistance and electric reliability by the use of the color material of General Formula (III).

Figure 3:
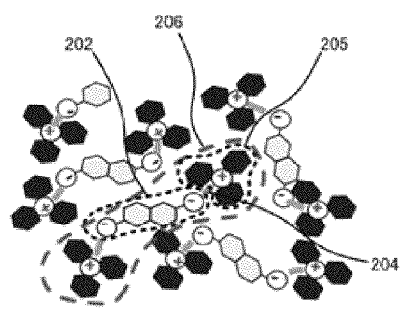
FIG. 3 is a schematic view illustrating the ionic bond of a salt compound of a dye of the related art.

Hitherto, in general, the dye easily dissolves in a solvent. A technique to form a salt compound has been used, as a technique to decrease the solubility. There is a technique to use a divalent anion as a counter anion, for example, as a technique to form a triarylmethane dye into a salt (for example, JP-A No. 2011-007847). According to this technique, a divalent counter anion 202 can form an ionic bond 204 with two dye cations 205 as illustrated in FIG. 3, and the solubility of the dye salt thus formed in a solvent is lower as compared with a case including only a dye. However, the dye even in the coloring layer using the salt compound formed by such a technique dissolves in the solvent used for forming the alignment layer or the like in some cases, and thus the electrical reliability also decreases. In addition, the ionic impurities can also be a factor that causes a problem such as burning by being mixed into the liquid crystal cell.

Figure 2:
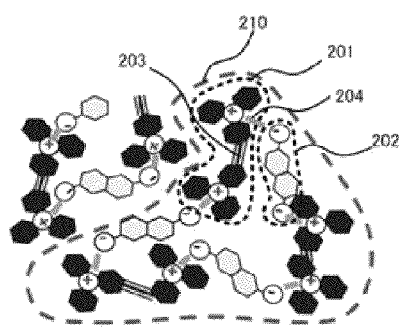
FIG. 2 is a schematic view illustrating the molecule assembly state of a color material represented by General Formula (I).

The color material represented by General Formula (III) above used in the present aspect has a di- or higher valent counter cation 201 formed by the binding of two or more cationic color developing sites via a linking 203 by A together with, a di- or higher valent counter anion 202 as illustrated in FIG. 2. For example, in a case in which both the anion and the cation are a divalent ion, it is presumed that an assembly of molecule 210 is formed by a plurality of molecules associated via continuous ionic bonds as illustrated in FIG. 2 rather than the anion and the cation are simply ironically bonded to each other at one molecule to one molecule in the agglomerate of color material. The assembly of molecule 210 behaves as if it is a single molecule in the agglomerate of color material and thus the apparent molecular weight significantly increases as compared with the molecular weight of the salt compound of the related art. In addition, it is presumed that the cohesive force of the color material in the solid state is enhanced, the movement thereof by the neat is decreased, and the color material is electrically stabled by the formation of the assembly of molecule 210, and thus the dissociation of the ion pair or the decomposition of the cation moiety can be suppressed. As a result, it is presumed that the solvent resistance of the color material represented by General Formula (III) is improved and the solvent resistance and electrical reliability of the coloring layer using the color material are improved. In addition, the ion pair in the fine particles including the assembly of molecule formed by a plurality of molecules associated via an ionic bond has lowered mobility and thus it is possible to suppress a decrease in contrast due to re-agglomeration between the fine particles.

Incidentally, in the color material represented by General Formula (III) above, the hydrocarbon of the linking group A directly bonded to the cationic color developing site does not have a π bond and thus the color characteristics such as color tone or transmittance of the cationic color developing site hardly change before and after the introduction of the linking group A.

In addition, the electrical reliability can be evaluated by the voltage retention rate when a liquid crystal cell unit 10 as illustrated in FIG. 1 is fabricated, and high electrical reliability means a high voltage retention rate. A predetermined voltage cannot be applied to the liquid crystal layer in a case in which the electrical reliability is low, and thus a problem that the contrast of the liquid crystal cell decreases and the like is caused.

Hereinafter, the anion moiety and cation moiety of the color material will be described.

(i) Cation Moiety

The details for the cation moiety are the same as those described in General Formula (I) above and thus the description thereof is omitted here. Incidentally, "e" in General Formula (III) corresponds to "b" in General Formula (I).

(ii) Anion Moiety

The anion moiety is a di- or higher valent anion having a structure represented by ($B^{c-}$), $B^{c-}$ is not particularly limited as long as it is a di- or higher valent anion and may be an organic anion or an inorganic anion. Here, the organic anion represents an anion which contains at least one carbon atom. In addition, the inorganic anion is an anion which does not contain a carbon atom.

In a case in which $B^{c-}$ is an organic anion, the structure thereof is not particularly limited. Among them, it is preferably an organic group having an anionic substituent.

Examples of the anionic substituent may include an imide acid group such as $—SO_2N^-SO_2CH_3$, $—SO_2N^-COCH_3$, $—SO_2N^-SO_2CF_3$, $—SO_2N^-COCF_3$, $—CF_2SO_2N^-SO_2CH_3$, $—CF_2SO_2N^-COCH_3$, $—CF_2SO_2N^-SO_2CF_3$ and $—CF_2SO_2N^-COCF_3$ or a substituent such as $—SO_3^-$, $—CF_2SO_3^-$, $—PO_3^{2-}$, $—COO^-$, $—CF_2PO_3^{2-}$ and $—CF_2COO^-$.

Among them, it is preferable to use two or more monovalent anionic substituents from the viewpoint that the cation is stabilized and the color development of the color material is stabilized. In addition, an imide acid group or $—SO_3^-$ and $—CF_2SO_2^-$ are preferable and further $—SO_3^-$ (a sulfonate group) is more preferable from the viewpoint of easy availability of the raw materials, manufacturing cost, and a high effect of stabilizing the cation by high acidity and thus maintaining the color developing state.

In the case of substituting a plurality of anionic substituents, the anionic substituents may be the same as one another or different substituents may be used.

The organic group to be substituted with an anionic substituent is not particularly limited. Examples of the organic group may include a linear, branched or cyclic saturated or unsaturated hydrocarbon group, a monocyclic or polycyclic aromatic group and a group formed by combining these. These may contain a hetero atom such as O, S and N in the carbon chain, may contain a carbonyl group, a carboxyl group, an oxycarbonyl group and an amide group, and may be substituted with a hydrogen atom. Examples of the substituent which the organic group may have may include a halogen atom.

Examples of the organic group to be substituted with an anionic substituent may include a hydrocarbon such as cyclopropane, cyclobutane, cyclopentane, cyclohexane, norbornane, bicyclo[2.2.2]hexane, bicyclo[3.2.3]octane and adamantane; an aromatic compound such as benzene, naphthalene, anthracene, phenanthrene, pyrene, triphenylene, fluorene, furan, thiophene, pyrrole, imidazole, pyran, pyridine, pyrimidine, pyrazine, triazine, indole, purine, quinoline, isoquinoline, xanthene and carbazole. Furthermore the organic group may have a substituent such as a halogen atom and an alkyl group.

Among them, the organic group to be substituted with an anionic substituent is preferably a monocyclic or polycyclic aromatic hydrocarbon group and a group formed by combining these from the viewpoint of easy introduction of the anionic substituent.

It is preferable to use an organic group having the absorption maximum in the wavelength region of 400 nm or less in a case in which no color change by the anion is intended. Examples of the organic group having the absorption maxima in the wavelength region of 400 nm or less may include an organic group consisting of a condensed polycyclic carbon ring such as naphthalene, tetralin, indene, fluorene, anthracene and phenanthrene; an organic group consisting of a chain polycyclic hydrocarbon such as biphenyl, terphenyl, diphenylmethane, triphenylmethane and stilbene; an organic group consisting of a 5-membered heterocyclic ring such as furan, thiophene, pyrrole, oxazole, thiazole, imidazole and pyrazole; an aromatic compound consisting of a 6-membered heterocyclic ring such as pyran, pyrone, pyridine, pyridazine, pyrimidine and pyrazine; an organic group consisting of a condensed polycyclic heterocyclic ring such as benzofuran, thionaphthene, indole, carbazole, coumarin, benzo-pyrone, quinoline, isoquinoline, acridine, phthalazine, quinazoline and quinoxaline.

In addition, as the organic group to be substituted with an anionic substituent, it is possible to use a skeleton derived from an azo dye, an anthraquinone dye, a triphenylmethane dye, a xanthene dye, a phthalocyanine dye and an indigo dye which are an organic compound or an organic metal compound. Alternatively, it is possible to use an acid dye, a direct dye and an acid mordant dye which are known in the related art.

The color tone of the resulting color material changes and thus the color tone of the color material represented by Chemical Formula (III) above can be adjusted to the desired one in the case of using a skeleton derived from a dye or an acid dye, a direct dye, an acid mordant dye and the like.

Examples of the acid dye may include the C. I. Acid Yellow 1, 3, 7, 9, 11, 17, 23, 25, 29, 34, 36, 38, 40, 42, 54, 65, 72, 73, 76, 73, 98, 99, 111, 112, 113, 114, 116, 119, 123, 128, 134, 135, 138, 139, 140, 144, 150, 155, 157, 160, 161, 163, 168, 169, 172, 177, 173, 179, 184, 190, 193, 196, 197, 199, 202, 203, 204, 205, 207, 212, 214, 220, 221, 228, 230, 232, 235, 238, 240, 242, 243, 251, the C. I. Acid Red 1, 4, 8, 14, 17, 18, 26, 27, 29, 31, 34, 35, 37, 42, 44, 50, 51, 52, 57, 66, 73, 80, 87, 88, 91, 92, 94, 97, 103, 111, 114, 129, 133, 134, 138, 143, 145, 150, 151, 158, 176, 182, 183, 198, 206, 211, 215, 216, 217, 227, 228, 249, 252, 257, 258, 260, 261, 266, 268, 270, 274, 277, 280, 281, 195, 308, 312, 315, 316, 333, 341, 345, 346, 349, 382, 333, 394, 401, 412, 417, 418, 422, 426, the C. I. Acid Orange 6, 7, 8, 10, 12, 26, 50, 51, 52, 56, 62, 63, 64, 74, 75, 94, 95, 107, 108, 169, 173, the C. I. Acid Blue 1, 7, 9, 15, 18, 23, 25, 27, 29, 40, 42, 45, 51, 62, 70, 74, 80, 83, 86, 87, 90, 92, 96, 103, 112, 113, 120, 129, 138, 147, 150, 158, 171, 182, 192, 210, 242, 243, 256, 259, 267, 278, 280, 285, 290, 296, 315, 324:1, 335, 340, the C. I, Acid Violet 6B, 7, 9, 17, 19 and the C. I. Acid green 1, 3, 5, 9, 16, 25, 27, 50, 58, 63, 65, 80, 104, 105, 106, 109.

Examples of the direct dye may include the C. I. Direct Yellow 2, 33, 34, 35, 38, 39, 43, 47, 50, 54, 58, 68, 69, 70, 71, 86, 93, 94, 95, 98, 102, 108, 109, 129, 136, 138, 141, the C. I. Direct Red 79, 82, 83, 84, 91, 92, 96, 97, 98, 99, 105, 106, 107, 172, 173, 176, 177, 179, 181, 182, 184, 204, 207, 211, 213, 218, 220, 221, 222, 232, 233, 234, 241, 243, 246, 250, the C. I. Direct Orange 34, 39, 41, 46, 50, 52, 56, 57, 61, 64, 65, 68, 70, 96, 97, 106, 107, the C. I, Direct Blue 57, 77, 80, 81, 84, 85, 86, 90, 93, 94, 95, 97, 98, 99, 100, 101, 106, 107, 108, 109, 113, 114, 115, 117, 119, 137, 149, 150, 153, 155, 156, 158, 159, 160, 161, 162, 163, 164, 166, 167, 170, 171, 172, 173, 183, 189, 130, 192, 193, 134, 196, 198, 199, 200, 207, 209, 210, 212, 213, 214, 222, 228, 229, 237, 238, 242, 243, 244, 245, 247, 248, 250, 251, 252, 256, 257, 253, 260, 268, 274, 275, 293, the C. I. Direct Violet 47, 52, 54, 59, 60, 65, 66, 79, 80, 81, 82, 84, 89, 90, 93, 95, 96, 103, 104, and the C. I. Direct Green 25, 27, 31, 32, 34, 37, 63, 65, 66, 67, 68, 69, 72, 77, 79, 82.

Examples of the acid mordant dye may include the C. I. Mordant Yellow 5, 8, 10, 16, 20, 26, 30, 31, 33, 42, 43, 45, 56, 61, 62, 65, the C. I. Mordant Red 1, 2, 3, 4, 9, 11, 12, 14, 17, 18, 19, 22, 23, 24, 25, 26, 30, 32, 33, 36, 37, 38, 39, 41, 43, 45, 46, 48, 53, 56, 63, 71, 74, 85, 86, 88, 90, 94, 35, the C. I. Mordant Orange 3, 4, 5, 8, 12, 13, 14, 20, 21, 23, 24, 28, 29, 32, 34, 35, 36, 37, 42, 43, 47, 48, the C. I. Mordant Blue 1, 2, 3, 7, 8, 9, 12, 13, 15, 16, 19, 20, 21, 22, 23, 24, 26, 30, 31, 32, 39, 40, 41, 43, 44, 48, 49, 53, 61, 74, 77, 33, 84, the C. I. Mordant Violet 1, 2, 4, 5, 7, 14, 22, 24, 30, 31, 32, 37, 40, 41, 44, 45, 47, 48, 53, 58, and the C. I. Mordant Green 1, 3, 4, 5, 10, 15, 19, 26, 29, 33, 34, 35, 41, 43, 53.

Among the above dyes, in a case in which the dye itself is a di- or higher valent anion, the dye can be used as an anion moiety of the color material in the present aspect as it is. In a case in which the dye itself is not a di- or higher valent anion, an anionic substituent is appropriately introduced into the dye so as to be a di- or higher valent anion.

It is preferable that the organic anion be one or more kinds selected from the group consisting of the anions represented by the following General Formula (IX), the following General Formula (X) and the following General Formula (XI) among them from the viewpoint of improving the solvent resistance and electrical reliability.

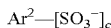    General Formula (IX)

(In General Formula (IX), $Ar^2$ represents a c-valent aromatic group which may have a substituent. "c" represents an integer of 2 or more.)

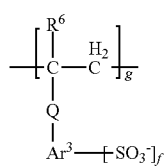    General Formula (X)

(In General Formula (X), $R^6$ represents a hydrogen atom, or a methyl group, $Ar^3$ represents an aromatic group which may have a substituent. Q represents a direct bona or a divalent linking group, "f" represents an integer of 1 or more, and "g" represents an integer of 2 or more.)

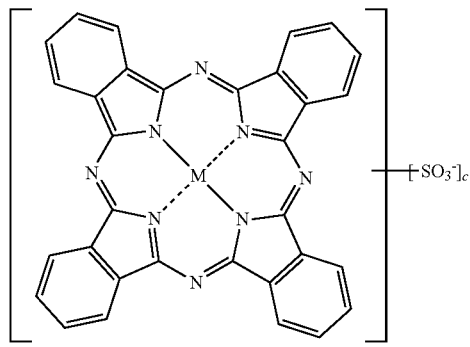    General Formula (XI)

(In General Formula (XI), M represents two hydrogen atoms or Co, Mg, Al, Ni, Co, Fe or Zn. The sulfonate group ($-SO_3^-$ group) is substituted on the aromatic ring, and "c" represents an integer from 2 to 4.)

The produced color material has a characteristic that the unique color of the cation represented by General Formula (III) is likely to be retained since the anion is colorless or pale yellow in the case of using the anion of General Formula (IX) above as the anion moiety of the color material.

The anion valence increases and thus the anion can interact with more cations represented by General Formula (III) in the case of using the anion of General Formula (X) above as the anion moiety of the color material. As a result, the color material has a characteristic that the cohesive property and insolubility in a solvent thereof are enhanced.

It is possible to adjust the color of the color material to the desired color in combination with the cation moiety in the case of using the anion of General Formula (XI) above as the anion moiety of the color material.

The aromatic group of $Ar^2$ and $Ar^1$ is not particularly limited. The aromatic group may be a heterocyclic ring in addition to an aromatic hydrocarbon group consisting of a carbon ring. Examples of the aromatic hydrocarbon may include a condensed polycyclic aromatic hydrocarbon group such as a naphthalene ring, a tetralin ring, an indene ring, a fluorene ring, an anthracene ring and a phenanthrene ring in addition to a benzene ring; and a chain polycyclic hydrocarbon group such as biphenyl, terphenyl, diphenylmethane, triphenylmethane and stilbene. The chain polycyclic hydrocarbon group may have a hetero atom such as O and S in the chain skeleton such as diphenyl ether. On the other hand, examples of the heterocyclic ring in the heterocyclic group may include a 5-membered heterocyclic ring such as furan, thiophene, pyrrole, oxazole, thiazole, imidazole and pyrazole; a 6-membered heterocyclic ring such as pyran, pyrone, pyridine, pyridazine, pyrimidine and pyrazine; a condensed polycyclic heterocyclic ring such as benzofuran, thionaphthene, indole, carbazole, coumarin, benzo-pyrone, quinoline, isoquinoline, acridine, phthalazine, quinazoline and quinoxaline. These aromatic groups may have a substituent.

Examples of the substituent belonging to the aromatic group may include an alkyl group having from 1 to 5 carbon atoms and a halogen atom.

$Ar^2$ and $Ar^3$ are preferably an aromatic group having from 6 to 20 carbon atoms and more preferably an aromatic group consisting of a condensed polycyclic carbon ring having from 10 to 14 carbon atoms. Among them, it is more preferably a phenylene group or a naphthalene group from the viewpoint that the structure is simple and the raw material is inexpensive.

In General Formula (X), Q represents a direct bond, or a divalent linking group. Examples of the divalent linking group may include an alkylene group having from 1 to 10 carbon atoms, an arylene group, a —CONH— group, a —COO— group, an ether group having from 1 to 10 carbon atoms (—R'—OR"—: R' and R" each independently represents an alkylene group) and a combination thereof. Among them, Q is preferably a direct bond or a —COO— group.

In General Formula (X), "f" is not particularly limited as long as it is an integer of 1 or more. "f" is more preferably 1 from the viewpoint of easy availability of the raw materials.

In addition, "g" represents an integer of 2 or more. Among them, "g" is preferably 50 or more and more preferably 80 or more from the viewpoint of heat resistance. On the other hand, "g" is preferably 3,000 or less and more preferably 2000 or less from the viewpoint of solubility. The weight average molecular weight of General Formula (X) is preferably from 10,000 to 100,000. Here, the weight average molecular weight is measured by GPC (gel permeation chromatography) and determined in terms of standard polystyrene. The measurement is performed using HLC-8120GPC™ manufactured by TOSOK CORPORATION, N-methylpyrrolidone to which 0.01 mol/L of lithium bromide is added as the elution solvent, polystyrene standards for calibration curve having a Mw of 377400, 210500, 96000, 50400, 206500, 10850, 5460, 2930, 1300, 580 (these are Easi PS-2™ series manufactured by Polymer Laboratories Inc.) and a Mw of 1090000™ (manufactured by TOSOH CORPORATION), and TSK-GEL ALPHA-M™×2 pieces (manufactured by TOSOH CORPORATION) as the measurement column.

In General Formula (X), the plurality of constitutional units may be the same as one another or may contain two or more kinds. Incidentally, in General Formula (X), the sum of a plurality of "f" corresponds to in General Formula (III).

On the other hand, in a case in which $B^{c-}$ is an inorganic anion, the configuration or composition thereof is not particularly limited as long as it is an inorganic oxo acid and a condensate obtained by dehydration thereof. Examples of the inorganic anion may include an inorganic anion such as a di- or higher valent anion of oxo acid (a phosphate ion, a sulfate ion, a chromate ion, a tungstate ion ($WO_4^{2-}$), a molybdate ion ($MoO_4^{2-}$) and the like) or a polyacid ion formed by the condensation of a plurality of oxo acids or a mixture thereof.

The polyacid may be an isopoly acid ion $(M_mO_n)^{c-}$ or a heteropoly acid ion $(X_1M_mO_n)^{c-}$. In the above ion formulas, M represents a poly atom, X represents a heteroatom, "m" represents the composition ratio of poly atom, and "n" represents the composition ratio of oxygen atom. Examples of the poly atom M may include Mo, W, V, Ti and Nb. In addition, examples of the heteroatom X may include Si, P, As, S, Fe and Co.

Among them, $B^{c-}$ is preferably an anion of an inorganic acid containing at least either of molybdenum (Mo) or tungsten (W) from the viewpoint of heat resistance.

In addition, in the present aspect, $B^{c-}$ is preferably a polyacid anion containing at least either of molybdenum (Mo) or tungsten (W), and two embodiments may be mentioned as a more suitable embodiment.

The anion moiety ($B^{c-}$) of the color material of the first embodiment is a c-valent polyacid anion that contains molybdenum and tungsten and has a molar ratio of molybdenum and tungsten of from 0.4;99.6 to 15:85. In addition, the anion moiety ($B^{c-}$) of the color material of the second embodiment is a c-valent polyacid anion that contains at least tungsten and has a molar ratio of molybdenum to tungsten of less than 0.4/99.6.

Incidentally, in the present aspect, the molar ratio of molybdenum and tungsten represents the molar ratio of the molybdenum atom and the tungsten atom in the entire color material represented by General Formula (III), and the molar ratio of molybdenum to tungsten represents the value of the molar ratio of the molybdenum atom to the tungsten atom in the entire color material represented by General Formula (III).

The action to exert the effects described above by the specific combination has not yet been elucidated but is presumed as follows.

The cationic color material is generally known to be oxidised by light and thus discolored. On the other hand, it is known that a polyacid containing tungsten or molybdenum has photoreduction property and the photoreduction reaction is reversible. It is presumed that the use of such a polyacid as an anion makes it possible to suppress the oxidation of the cation by light and to improve the light resistance. The mechanism has not yet been elucidated but is presumed as follows. The color material exhibits excellent ability to suppress the above oxidation reaction by containing a polyacid anion containing tungsten and a polyacid anion containing molybdenum which are in different electron states at a specific ratio.

The color material of the first embodiment uses a di- or higher valent polyacid anion that contains molybdenum and tungsten as the counter anion and has a molar ratio of molybdenum and tungsten of from 0.4:99.6 to 15:85. It is possible to improve the light resistance and also the neat resistance by mixing a small amount of polyacid anion containing molybdenum as compared with the case of using only the polyacid anion containing tungsten. It is presumed that the neat resistance is particularly improved, when the cation forms an ion pair with the polyacid anion containing tungsten. However, it is presumed that a gap is formed between the polyacid anion and the cation since the polyacid ion containing tungsten has a large ionic radius. On the other hand, it is presumed that the polyacid anion containing molybdenum has an ionic radius smaller than the polyacid anion containing tungsten. It is presumed that the polyacid anion containing molybdenum enters the gap formed when the cation and the polyacid anion containing tungsten form an ion pair with as the color material used in the present aspect further contains a small amount of polyacid anion containing molybdenum having a smaller ionic radius. It is presumed that this allows the color material to exhibit improved heat resistance and light resistance. In addition, it is presumed that, in the case of using a heteropoly acid containing both molybdenum and tungsten, there is a distribution in ionic radius of the heteropoly acid itself and a heteropoly acid having a smaller ionic radius enters the gap between the heteropoly acid having a larger ionic radius and the cation, whereby the heat resistance and light resistance of the color material are improved.

On the other hand, the color material of the second embodiment uses a di- or higher valent polyacid anion that contains at least tungsten as the counter anion and has a molar ratio of molybdenum to tungsten of less than 0.4/99.6. As described above, the heat resistance of the color material is particularly improved when the cation forms an ion pair with the polyacid anion containing tungsten, and the color material has heat resistance equivalent to the color material of the first embodiment. For the color filter application, a coloring layer particularly exhibiting high brightness is required. The present inventors have been studying the heat resistance of the color material in detail from this point of view. As a result, it has been demonstrated that a decrease in brightness of the coloring layer after heating at a high temperature is further suppressed even as compared with the color material of the first embodiment as well as the brightness of the coloring layer after exposure is higher as compared with the color material of the first embodiment in a case in which the content proportion of molybdenum in the polyacid anion is in a low range so that the molar ratio of molybdenum to tungsten is less than 0.4/99.6 or the polyacid anion does not contain molybdenum but contains only tungsten. Although the action to exert such an effect has not yet been elucidated; the coloring layer formed using such a color material of the second embodiment can achieve higher brightness.

From these results, it is presumed that the color material represented by General Formula (III) is particularly excellent in heat resistance and light resistance, and it is possible to obtain a color material that can form a blue coloring layer excellent in heat resistance and light resistance while achieving the same high brightness as a dye.

The polyacid anion may be an isopoly acid, ion $(M_mO_n)^{c-}$ or a heteropoly acid ion $(X_1M_mO_n)^{c-}$. In the above ion formulas, M represents a poly atom, X represents a heteroatom, "m" represents the composition ratio of poly atom, and "n" represents the composition ratio of oxygen atom. The poly atom M essentially contains either of Mo (molybdenum) or W (tungsten). The poly atom M may contain two or more kinds. The poly atom M is preferably at least either of Mo or W. Examples of the heteroatom X may include Si, P, As, S, Fe and Co. In addition, a counter cation such as $Na^+$ or $H^+$ may be partially contained.

Specific examples of the polyacid anion containing at least either of molybdenum or tungsten may include a Keggin type tungstophosphoric acid ion $\alpha\text{-}[PW_{12}O_{40}]^{3-}$, a Dawson type tungstophosphoric acid ion $\alpha\text{-}[P2W_{18}O_{62}]^{6-}$ and $\beta\text{-}[P_2W_{18}O_{62}]^{6-}$ and a Keggin type tungstosilic acid ion $\alpha\text{-}[SiW_{12}O_{40}]^{4-}$, $\beta\text{-}[SiW_{12}O_{40}]^{4-}$ and $\gamma\text{-}[SiW_{12}O_{40}]^{4-}$ and other examples may include $[P_2W_{17}O_{61}]^{10-}$, $[P_2W_{15}O_{56}]^{12-}$, $[H_2P_2W_{12}O_{45}]^{12-}$, $[NaP_5W_{30}O_{110}]^{14-}$, $\alpha\text{-}[SiW_9O_{34}]^{10-}$, $\gamma\text{-}[SiW_{10}O_{36}]^{8-}$, $\alpha\text{-}[SiW_{11}O_{35}]^{8-}$, $\beta\text{-}[SiW_{11}O_{39}]^{8-}$, $[W_6O_{19}]^{2-}$, $[W_{10}O_{32}]^{4-}$, $WO_4^{2-}$, $\alpha\text{-}[PMo_{12}O_{40}]^{3-}$, $\alpha\text{-}[PW_{11}MoO_{4}]^{3-}$, $\alpha\text{-}[PW_9Mo_3O_{40}]^{3-}$, $\alpha\text{-}[PW_3Mo_9O_{40}]^{3-}$, $\alpha\text{-}[SiMo_{12}O_{40}]^{4-}$, $\alpha\text{-}[P_2Mo_{18}O_{62}]^{6-}$, $[Mo_2O_7]^{2-}$, $[Mo_6O_{19}]^{2-}$ and $[Mo_8O_{26}]^{4-}$.

The anion of an inorganic acid containing at least either of molybdenum or tungsten is preferably a heteropoly acid and more preferably a heteropoly acid containing P (phosphorus) among these from the viewpoint of heat resistance, light resistance and easy availability of the raw materials.

As the polyacid anion in the color material of the first embodiment, it is possible to use one kind of the above anions singly or two or more kinds thereof in combination. The molar ratio of molybdenum and tungsten in the entire polyacid anion may be from 0.4:99.6 to 15:85 in the case of using two or more kinds in combination. Among them, the molar ratio of molybdenum and tungsten is preferably from 0.8:99.2 to 13:87 and more preferably from 1.0:99.0 to 10:90 from the viewpoint of excellent heat resistance and light resistance.

In addition, as the polyacid anion in the color material of the second embodiment, it is possible to use one kind of the above anions singly or two or more kinds thereof in combination. The molar ratio of molybdenum to tungsten in the entire polyacid anion may be less than 0.4/99.6 in the case of using two or more kinds in combination. Among them, the molar ratio of molybdenum to tungsten is preferably 0.3/99.7 or less from the viewpoint that the brightness hardly decreases at the time of heating. This range includes the case in which molybdenum is not contained but only tungsten is contained as the poly atom, that is, the molar ratio of molybdenum and tungsten in the polyacid anion is 0:100.

"a" in General Formula (III) above represents the number of color developing cation moiety constituting the cation, and "a" represents an integer from 2 to 4. In other words, in the color material used in the present aspect, the valence of the cation is 2 or more and the valence of the anion is also 2 or more, and thus the assembly of molecule described above is formed and heat resistance and light resistance are improved. On the other hand, "a" may be 4 or less and more preferably 3 or less from the viewpoint of ease of manufacture.

"b" in General Formula (III) above represents the number of cationic molecules in the assembly of molecule, "d" represents the number of anionic molecules in the assembly of molecule, and "b" and "d" represent an integer of 1 or more. In the crystal or agglomerate of the color material in the present aspect, each of "b" and "d" is not limited to 1, but can take any natural number of 2 or more such as 2, 3 and 4 . . . . It is preferable that at least a part of the color material of the present aspect form the assembly of molecule in which b≥2 from the viewpoint of heat resistance and light resistance. In addition, it is preferable that at least a part of the color material of the present aspect form the assembly of molecule in which d≥2 from the viewpoint of heat resistance and light resistance.

The plurality of cations in the assembly of molecule may consist of one kind singly or two or more kinds in combination in a case in which "b" is 2 or more. In addition, the plurality of anions in the assembly of molecule may consist of one kind singly or two or more kinds in combination and it is also possible to use an organic anion and inorganic anion in combination in a case in which "d" is 2 or more.

The average particle size of the color material and the content of the color material in the blue coloring layer can be the same as the details described in the section of the blue coloring layer of the first aspect described above, and thus the description thereof is omitted here.

For the method for forming the color material, it is possible to use the method described in Japanese Patent No. 5223980 and Japanese Patent No. 5403175.

(B) Coloring Layers of Other Colors

The plurality of coloring layers used in the invention usually have a red coloring layer and a green coloring layer in addition to the blue coloring layer described above. In addition, the coloring layers may have a coloring layer other than the three coloring layers described above.

The red coloring layer and the green coloring layer usually contain a color material and a binder resin.

Examples of the color material used in the red coloring layer may include a perylene-based pigment, a lake pigment, an azo-based pigment, a quinacridone-based pigment, an anthraquinone-based pigment, an anthracene-based pigment and an isoindoline-based pigment. These pigments may be used singly or as a mixture of two or more kinds.

In the invention, it is possible to suitably use PR149, PR177, PR179, PR202, PR207, PR209, PR214, PR242, PR254, PR255 and PR264 and the Pigment Orange 38 as the red color material.

In addition, examples of the color material usable in the green coloring layer may include a phthalocyanine-based pigment such as a halogen polysubstituted phthalocyanine-based pigment or a halogen polysubstituted copper phthalocyanine-based pigment, a triphenylmethane-based basic dye, an isoindoline-based pigment and an isoindolinone-based pigment. These pigments or dyes may be used singly or as a mixture of two or more kinds.

In the invention, examples of the green color material may include PG1, PG7, PG36 and PG58.

The binder resin used in the red coloring layer and the green coloring layer and other components are the same as those used in the blue coloring layer, and thus the description thereof is omitted here.

In addition, the content of the color material in the red coloring layer and the green coloring layer can be the same as the content of the color material in the blue coloring layer and thus the description thereof is omitted here.

(C) Others

The arrangement of a plurality of coloring layers in the invention can be the same as that used for a general liquid crystal display device, specifically a general arrangement such as a stripe type, a mosaic type, a triangle type and a four-pixel arrangement type. In addition, the width of the coloring layer, the area and the like can be arbitrarily set.

The thickness of the coloring layer can be the same as that used in a general color filter and is not particularly limited, but it is usually preferably in the range of from 0.5 μm to 5 μm and is preferably in the range of from 0.5 μm to 3.5 μm.

The method for forming the coloring layer can be the same as the method used in a general method for forming a color filter and is not particularly limited, and examples thereof may include a photolithography method and an inkjet method.

(2) Transparent Substrate

The transparent substrate used in the invention is one that supports the plurality of coloring layers described above and the like.

As the transparency of the transparent substrate, for example, the transmittance of the transparent substrate in the visible light region is preferably 80% or more and more preferably 90% or more. Here, the transmittance of the transparent substrate can be measured in conformity with JIS K7361-1 (the test method of total light transmittance of plastic and transparent material).

The transparent substrate in the color filter of the invention may be a substrate which is transparent with respect to visible light and is not particularly limited, and a transparent substrate used in a general color filter can be used. Specific examples thereof may include a transparent rigid material which is not flexible such as a quartz glass, non-alkali glass and a synthetic quartz plate or a transparent flexible material which is flexible such as a transparent resin film and an optical resin plate.

The thickness of the transparent substrate is not particularly limited, and for example, it is possible to use a transparent substrate having a thickness of about from 100 μm to 1 mm depending on the application of the color filter of the invention.

(3) Other Configurations

Incidentally, the color filter of the invention may be formed to include, for example, a light shielding portion, an overcoat layer or a transparent electrode layer and further an alignment layer or a columnar spacer other than the transparent substrate and the plurality of coloring layers. These configurations can be the same as those used in a general color filter, and thus the description thereof is omitted here.

(4) Method for Forming Color Filter

The method for forming the color filter of the invention is not particularly limited as long as it can form a coloring layer described above, and it can be the same as a general method for forming a color filter.

2. Counter Substrate

For the counter substrate of the invention, it is possible to appropriately select and use a general one depending on the driving mode of the liquid crystal cell. An alignment layer is usually formed on the surface on the side facing the color filter of the counter substrate. In addition, for example, the columnar spacer described above may be formed on the surface on the side facing the color filter of the counter substrate if necessary.

3. Liquid Crystal Layer

The liquid crystal used in the liquid crystal layer of the invention can be appropriately selected depending on the driving mode of the liquid crystal cell unit, and it is possible to use a general one. It is possible to use various kinds of liquid crystal having different dielectric anisotropy and a mixture thereof as the liquid crystal.

As the method for forming the liquid crystal layer, it is possible to use a method generally used as a method for fabricating a liquid crystal cell, and examples thereof may include a vacuum injection system or a liquid crystal dropping system.

In the vacuum injection system, for example, a liquid crystal cell is fabricated in advance using the color filter and the counter substrate, an isotropic liquid is prepared by raising the temperature of the liquid crystal, the liquid crystal is injected into the liquid crystal cell in an isotropic liquid state by utilizing the capillary effect, and the liquid crystal cell is sealed with an adhesive, whereby the liquid crystal layer can be formed. Thereafter, it is possible to orient the enclosed liquid crystal by gradually cooling the liquid crystal cell to room temperature.

In the liquid crystal dropping system, for example, a sealing agent is coated on the periphery of the color filter, the color filter is heated to a temperature at which the liquid crystal becomes an isotropic phase, the liquid crystal is dropped in an isotropic liquid state using a dispenser or the like, and the color filter and the counter substrate are overlapped each other under reduced pressure and pasted via a sealing agent, whereby the liquid crystal layer can be formed. Thereafter, it is possible to orient the enclosed liquid crystal by gradually cooling the liquid crystal cell to room temperature.

4. Others

The liquid crystal cell unit of the invention is not particularly limited as long as it has the color filter, the counter substrate and the liquid crystal layer which are described above, and it is possible to appropriately select and add a required configuration. In the liquid crystal cell unit, a sealing agent to seal the liquid crystal layer is usually disposed between the color filter and the counter substrate. The sealing agent can be the same as those used in a general liquid crystal display device, and thus the description thereof is omitted here.

As the driving mode of the liquid crystal cell unit of the invention, it is possible to adopt a driving mode generally used for a liquid crystal display device. Examples of such a driving mode may include a TN mode, an IPS mode, an OCB mode and an MVA mode. Any of these modes can be suitably used in the invention.

The method for forming the liquid crystal cell unit can be the same as a general method for forming a liquid crystal cell of a liquid crystal display device.

II. Backlight Unit

The backlight unit of the invention includes at least a light emitting device.

1. Light Emitting Device

The light emitting device according to the invention has a blue light emitting element, a red fluorescent substance and a green fluorescent substance.

The light emitting device of the invention is usually adjusted so as to exhibit an emission spectrum having one or more peak wavelengths in each of the wavelength regions of a red region (wavelength range of from 600 nm to 680 nm), a green region (wavelength range of from 500 nm to 545 nm) and a blue region (wavelength range of from 380 nm to 485 nm).

The emission spectra of the light emitting device of the invention as well as the blue light emitting element, the red fluorescent substance and the green fluorescent substance can be measured using a general spectrophotometer.

1) Red Fluorescent Substance

The red fluorescent substance according to the invention is a fluorescent substance that is surface treated and represented by the following General Formula (II).

$$M^1{}_2[M^2{}_{1-x}Mn^{4+}{}_xF_6] \qquad \text{General Formula (II)}$$

(In General Formula (II) above, $M^1$ represents at least one kind selected from the group consisting of $K^+$, $Li^+$, $Na^+$, $Rb^+$, Cs$^+$ and NH$_4^+$, M$^2$ represents at least one kind selected from the group consisting of the Group 4 elements and the Group 14 elements, and "x" is 0<x<0.2.)

The red fluorescent substance is a red fluorescent substance that is doped with tetravalent Mn, has a chemical composition represented by General Formula (II) above and has a surface region having a concentration of tetravalent manganese ion lower than the concentration of tetravalent manganese ion in the inner region of the fluorescent substance. Such a fluorescent substance can be formed by subjecting the surface of the fluorescent substance particles which is prepared by a method of the related art and has a chemical composition represented by General Formula (II) above to a surface treatment to be covered with another material at a certain thickness, for example, as described in JP-A No. 2010-093132. Such another material can be the same as those used as a general covering material of a fluorescent substance, and specific examples thereof may include an oxide such as alumina and silica, a resin exhibiting high gas barrier property or a compound containing the constituent element of the chemical composition of the fluorescent substance having a lowered concentration of tetravalent manganese ion. It is preferable that the above another material exhibit high translucency with respect to the light emission of the light emitting element or the fluorescent substance so that the material itself does not absorb light. The surface treatment by covering the fluorescent substance particle surface can be conducted by allowing the fluorescent substance particle surface to react in a reaction solution until a certain depth is obtained or by attaching another material to the fluorescent substance particle surface by a known method.

In General Formula (II) above, M$^1$ represents at least one kind selected from the group consisting of K$^+$, Li$^+$, Na$^+$, Rb$^+$, Cs$^+$ and NH$_4^+$. In addition, M$^2$ represents at least one kind selected from the group consisting of the Group 4 elements and the Group 14 elements and more preferably at least one kind of Si, Ge, Sn, Ti and Zr. In addition, "x" is 0<x<0.2.

In addition, the activator agent concentration in the red fluorescent substance is not particularly limited as long as the desired red light can be emitted, but it is preferably 6 mol % or less and preferably within the range of from 1 to 5 mol % and particularly within the range of from 2 to 4 mol % among them.

This is because there is a possibility of a decrease in light resistance of the red fluorescent substance in a case in which the activator agent concentration in the red fluorescent substance is too high and there is a possibility that the red fluorescent substance hardly absorbs excitation light and thus the luminous efficacy thereof decreases in a case in which the activator agent concentration in the red fluorescent substance is too low.

The activator agent concentration in the red fluorescent substance means a molar ratio of M in the fluorescent substance represented by General Formula (II) described above and can be measured using the high frequency inductively coupled plasma emission spectrometry (ICP emission spectrometry) or the fluorescent X-ray spectroscopy.

In the invention, it is possible to use a known Mg-fluorogermanate fluorescent substance doped with Mn or a known CASN or SCASN-based nitride fluorescent substance in addition to the fluorescent substance represented by General Formula (II) described above.

The red fluorescent substance is usually dispersed in the resin together with the green fluorescent substance to be described below and disposed on the blue light emitting element to be described below. As the resin, those used for a general light emitting device can be used, specifically, a silicone resin and the like can be mentioned.

(2) Green Fluorescent Substance

As the green fluorescent substance according to the invention, it is possible to appropriately select and use a green fluorescent substance from these used as a general white LED light source. Examples thereof may include a Mn-doped γ-ALON fluorescent substance, a CaSc$_2$O$_4$:Ce-based fluorescent substance, a Ca$_3$Sc$_2$Si$_3$O$_{12}$:Ce-based fluorescent substance, a (Mg, Ca, Sr, Ba) Si$_2$O$_2$N$_2$:Eu-based fluorescent substance, M$_3$Si$_6$O$_{12}$N$_2$:Eu (provided that M represents a alkaline earth metal element), a Eu-doped halosilicate fluorescent substance such as (Ca, Sr, Ba, Zn)$_8$MgSi$_4$O$_{16}$ (F, Cl, Br, I):Eu, a Eu-doped silicate fluorescent substance such as a (Ba, Sr, Ca, Mg)$_2$SiO$_4$: Eu-based fluorescent substance, a En-doped β-sialon fluorescent substance such as (Si, Al)$_6$(O, N)$_8$:Eu, a Eu-doped thiogallate fluorescent substance such as a SrGa$_2$S$_4$:Eu-based fluorescent substance, a rare earth, aluminate fluorescent substance represented by (Y, Lu)$_3$(Al, Ga)$_5$O$_{12}$:Ce and a lanthanum silicon nitride-based fluorescent substance represented by La$_3$Si$_6$N$_{11}$:Ce. In addition, one kind or two or more kinds of the above green fluorescent substances may be used.

Incidentally, in the above composition formulas, the case in which a plurality of elements are listed by separating with a comma (,) indicates that one kind or two or more kinds of the listed elements may be contained in any combination and composition.

In the invention, the green fluorescent substance is preferably a Eu-doped β-sialon fluorescent substance among them. This is because the green light can be favorably emitted and the time-dependent degradation is also less. As the Eu-doped β-sialon fluorescent substance, it is possible to use a known one, and for example, those described in International Publication NO. 2007/066733 pamphlet can be suitably used.

(3) Blue Light Emitting Element

The blue light emitting element of the invention emits light to excite the fluorescent substance.

As the blue light emitting element, it is possible to use those which emit light in the short wavelength region of visible light. In general, as a light emitting element that emits blue light, it is possible to use a nitride-based semiconductor (In$_x$Al$_y$Ga$_{1-x-y}$N, 0≤X, 0≤Y, X+Y≤1). In particular, as the blue light emitting element, it is possible to mention specifically a blue light emitting diode (blue LED) using the nitride-based semiconductor or a blue laser diode (LD). It is possible to use a known blue LED and a known blue LD.

(4) Other Configurations

The light emitting device used in the invention is not particularly limited as long as it has the blue light emitting element, the red fluorescent substance and the green fluorescent substance which are described above, and it is possible to appropriately select and use a required configuration.

Such a configuration can be the same as that used in a general light emitting device. The configuration can be appropriately selected depending on the type of the light emitting device, and a mount lead, an inner lead, a conducting wire, a mold member and the like can be mentioned, for example, in the case of a shell-type light emitting device. In addition, a lead frame, a conducting wire, an electrode and the like can be mentioned in the case of a surface mount type light emitting device.

In addition, as such a configuration, it is possible to mention a molded body for disposing the blue light emitting element, the red fluorescent substance and the green fluorescent substance which are described above and the like. As such a molded body, it is possible to use those used in a general light emitting device. In addition, examples of the material of the molded body may include an epoxy resin containing titanium oxide. In addition, the molded body can be integrally formed with the lead frame.

(5) Others

The type of the light emitting device is not particularly limited and can be appropriately selected from the types usually used. Examples of the type of the light emitting device may include a shell type and a surface mount type. In general, the shell type refers to a light emitting device in which the shape of the resin constituting the outer surface is formed in the shell type. In addition, the surface mount type refers to a light emitting device formed by filling a light emitting element to be the light source and a resin in a concave-shaped housing unit. In addition, examples of the form of the light emitting device may include a form in which a blue light emitting element is mounted on a plate-shaped mounting substrate and a sealing resin containing a green fluorescent substance and a red fluorescent substance is formed into a lens shape and the like so as to cover the blue light emitting element.

Figure 4:
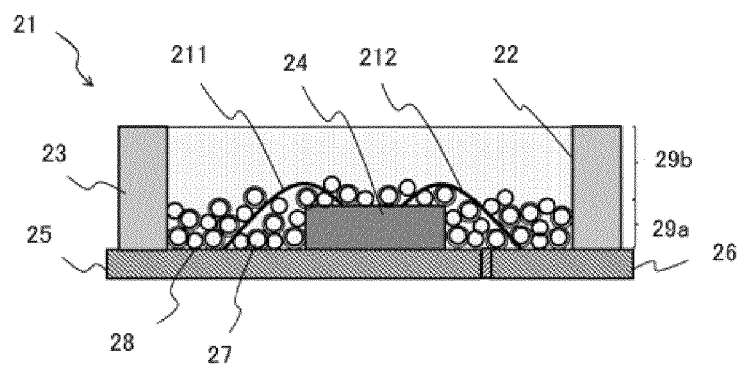
FIG. 4 is a schematic sectional view illustrating an example of a light emitting device in the invention.

Hereinafter, an example of the light emitting device according to an embodiment of the invention will be described with reference to the accompanying drawings. FIG. 4 is a schematic sectional view illustrating an example of the light emitting device according to the invention and an example of the surface mount type light emitting device.

A light emitting device 21 illustrated in FIG. 4 has a blue light emitting element 24 of a gallium nitride-based compound semiconductor that emits light in the short wavelength side of visible light (for example, from 380 nm to 485 nm) and a molded body 23 to form a concave portion 22 for placing the blue light emitting element 24. The molded body 23 has a first lead 25 and a second lead 26, and is integrally molded by a thermoplastic resin or a thermosetting resin. The molded body 23 forms the concave portion 22 having a bottom surface and side surfaces, and the blue light emitting element 24 is placed on the bottom surface of the concave portion 22. The blue light emitting element 24 has a pair of positive and negative electrodes, and the pair of positive and negative electrodes are electrically connected via the first lead 25, the second lead 26 and wires 211 and 212. The blue light emitting element 24 is sealed by a sealing member. It is preferable to use a thermosetting resin such as an epoxy resin, a silicone resin, an epoxy denatured silicone resin and a modified silicone resin as the sealing member. The sealing member contains a red fluorescent substance 27 and a green fluorescent substance 28 which convert the wavelength of light from the light emitting element. The sealing member is constituted by a first site 29a which contains a fluorescent substance at a high density and a second site 23b which contains a fluorescent substance at a low density or does not contain a fluorescent substance substantially.

In the invention, the light emitting device has a lead frame, and the red fluorescent substance is preferably disposed within 200 μm from the top surface of the lead frame and preferably disposed within a range within 150 μm and particularly preferably disposed within a range within 100 μm among them. In the invention, it is even more preferable that at least a part of the red fluorescent substance between the red fluorescent substance and the green fluorescent substance be in contact with the lead frame. This is because it is possible to secure the heat dissipation path of the fluorescent substance and to suitably suppress the degradation of the red fluorescent substance.

Incidentally, the distance from the top surface of the lead frame refers to the vertical distance from the surface on the blue light emitting element side of the first lead and the second lead to the surface of the fluorescent substance, for example, in FIG. 4.

(5) Method for Forming Light Emitting Device

The method for forming the light emitting device according to the invention can be the same as the method for forming a general light emitting device, and thus the description, thereof is omitted here.

2. Others

The backlight unit according to the invention is not particularly limited as long as it has the light emitting device, and it is possible to appropriately select and use a required configuration. Examples of such a configuration may include an optical member such as a light guide plate, a light diffusion sheet and a prism sheet and a mounting substrate to mount the light emitting device.

As the light guide plate, it is possible to use those used in a general light emitting device. The light guide plate is formed by injection molding an acrylic resin or an epoxy resin as a material in consideration of translucency and mechanical strength. Each side of the light guide plate may be subjected to the irregularity machining in consideration of the extraction of light.

In addition, the light diffusion sheet and the prism sheet can be the same as those used in a general backlight, and thus the description, thereof is omitted here.

In addition, as the mounting substrate, it is possible to use those used in a general light emitting device, and examples thereof may include a mounting substrate fabricated by forming a wiring pattern on an insulating plate material such as a glass epoxy resin by copper, silver or gold plating. The mounting substrate can be a flexible substrate exhibiting flexibility. In addition, the mounting substrate usually has an electrode terminal for connecting to the external electrode.

The light emitting device is connected to the wiring pattern of the mounting substrate by a conductive material such as solder or silver paste.

Figure 5:
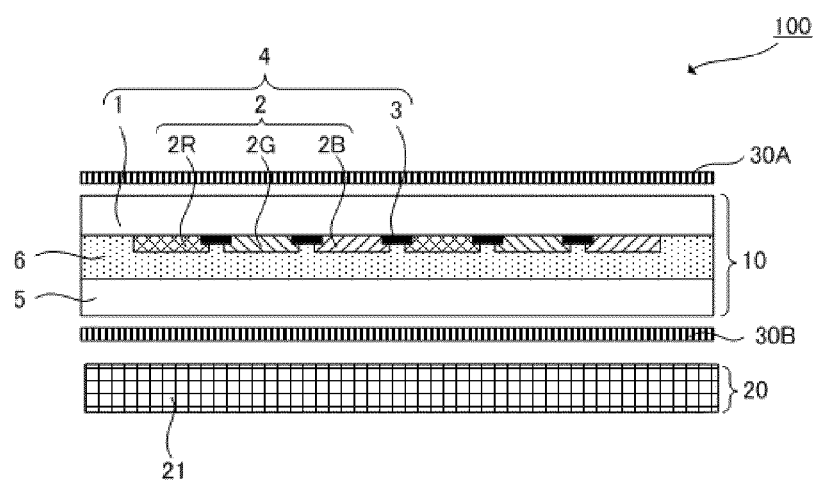
FIG. 5 is a schematic: sectional view illustrating another example of a liquid crystal display device of the invention.

In addition, the backlight unit according to the invention may be one in which the light emitting device 21 is disposed on the end surface of the light guide plate 220 as illustrated in FIG. 1 or a so-called direct type in which the light emitting device 21 is disposed on the entire surface on the side opposite to the liquid crystal cell unit 10 side of the optical member such as the polarizer 30B as illustrated in FIG. 5.

III. Other Configurations

The liquid crystal display device of the invention is desired to comprise the liquid crystal cell unit and the backlight unit which are described above, and it is possible to appropriately select and add other configurations if necessary. The liquid crystal display device of the invention usually has a polarizer disposed on both surfaces of the liquid crystal cell unit. In addition, a touch panel sensor may be disposed on the display surface side of the liquid crystal cell unit of the liquid crystal display device. In addition, a front plate may be disposed on the display surface side of the liquid crystal display device. The polarizer, the touch panel sensor and the front panel can be the same as those used in a general liquid crystal display device, and thus the description thereof is omitted here.

IV. Others

The method for manufacturing a liquid crystal display device of the invention can be the same as a general method for manufacturing a liquid crystal display device, and examples thereof may include the method described in "B, method for manufacturing a liquid crystal, display device to be described below.

Examples of the application of the liquid crystal display device of the invention may include a mobile phone, a tablet, television, a personal computer, and a wearable terminal.

B. Method for Manufacturing Liquid Crystal Display Device

The method for manufacturing a liquid crystal display device of the invention is a method for manufacturing a liquid crystal display device comprising a liquid crystal cell unit including a color filter having a transparent substrate and a plurality of coloring layers formed on the transparent substrate, a counter substrate and a liquid crystal layer formed between the color filter and the counter substrate and a backlight unit including a light emitting device having a blue light emitting element, and a red fluorescent substance and a green fluorescent substance, the method comprising steps of: forming the color filter having a blue coloring layer containing a color material represented by General Formula (I) above; and forming the light emitting device, wherein the red fluorescent substance is a fluorescent substance that is surface treated and represented by General Formula (II) above.

In addition, the method for manufacturing a liquid crystal display device of the invention is a method for manufacturing a liquid crystal display device comprising a liquid crystal cell unit including a color filter having a transparent substrate and a plurality of coloring layers formed on the transparent substrate, a counter substrate and a liquid crystal layer formed between the color filter and the counter substrate, and a backlight unit including a light emitting device having a blue light emitting element, and a red fluorescent substance and a green fluorescent substance, the method comprising steps of: forming the color filter having a blue coloring layer containing a color material represented by General Formula (III) above; and forming the light emitting device wherein the red fluorescent substance is a fluorescent substance that is surface treated and represented by General Formula (II) above.

According to the invention, it is possible to manufacture a liquid crystal display device which exhibits power saving property and high display quality and is capable of suppressing the time-dependent degradation in display quality by comprising the color filter forming step and the light emitting device forming step.

The method for forming a color filter and the method for forming a light emitting device used in the color filter forming step and the light emitting device forming step according to the method for manufacturing a liquid crystal display device of the invention and the resulting color filter and the resulting light emitting device can be the same as the details described in the section "A liquid crystal display device" described above, and the description thereof is omitted here. In addition, the liquid crystal display device to be manufactured by the invention can also be the same as the details described in the section "A liquid crystal display device" described above, and the description thereof is omitted here.

Incidentally, the invention is not limited to the above embodiments. The above embodiments are the illustration and have substantially the same configuration as the technical idea described in the claims of the invention, and any one which exhibits the same effects is encompassed in the technical scope of the invention.

EXAMPLES

Example 1

(Preparation of Curable Resin Composition)

In a polymerization vessel, 63 parts by weight of methyl methacrylate (MMA), 12 parts by weight of acrylic acid (AA), 6 parts by weight of 2-hydroxyethyl methacrylate (HEMA) and 88 parts by weight of diethylene glycol dimethyl ether (DMDG) were charged and dissolved by stirring, and 7 parts by weight of 2,2-azobis (2-methylbutyronitrile) was added thereto and uniformly dissolved. Thereafter, the mixture was stirred for 2 hours at 85° C. under a nitrogen gas stream and further allowed to react for 1 hour at 100° C. To the solution thus obtained, 7 parts by weight of glycidyl methacrylate (GMA), 0.4 part by weight of triethylamine and 0.2 part, by weight of hydroquinone were further added and stirred for 5 hours at 100° C., thereby obtaining a copolymer resin solution (solid matter of 50%).

Next, the following materials were mixed by stirring at room temperature to obtain a curable resin composition.

<Composition of Curable Resin Composition>

| | |
|---|---|
| The above copolymer resin solution (solid matter of 50%): | 16 parts by weight |
| Dipentaerythritol pentaacrylate (Sartomer Company Inc., SR399 ™): | 24 parts by weight |
| Ortho-cresol novolac type epoxy resin (Mitsubishi Yuka Shell Epoxy Co., Ltd. (current Japan Epoxy Resins Co., Ltd.) Epicoat 180S70 ™): | 4 parts by weight |
| 2-methyl-1-(4-methylthiophenyl)-2-morpholinopropan-1-one: | 4 parts by weight |
| Dietnylene glycol dimethyl ether: | 52 parts by weight |

(Formation of Black Matrix)

First, the components were mixed in the following quantities and sufficiently dispersed by a sand mill, thereby preparing a black pigment dispersion.

<Composition of Black Pigment Dispersion>

| | |
|---|---|
| Black pigment: | 23 parts by weight |
| Polymer dispersing material (BYK Japan KK, Disperbyk111 ™): | 2 parts by weight |
| Solvent (diathylene glycol dimethyl ether): | 75 parts by weight |

Next, the components were sufficiently mixed in the following quantities to obtain a composition for light shielding layer.

<Composition of Composition for Light Shielding Layer>

| | |
|---|---|
| The above black pigment dispersion: | 61 parts by weight |
| Curable resin composition: | 20 parts by weight |
| Diethylene glycol dimethyl ether: | 30 parts by weight |

Then, the composition for light shielding layer was coated on a glass substrate (ASAHI GLASS CO., LTD., AN100™) having a thickness of 0.7 mm by a spin coater, dried for 3 minutes at 100° C., thereby forming a light shielding layer having a film thickness of about 1 μm. The light shielding layer was exposed to the light shielding pattern by an ultrahigh pressure mercury lamp, developed with a 0.05 wt % aqueous solution of potassium hydroxide and then subjected to the heat treatment by allowing the substrate to stand for 30 minutes in an atmosphere of 180° C., thereby forming a black matrix in the region for forming the light shielding portion.

(Formation of Coloring Layer)

A red curable resin composition having the following composition was coated on the substrate having the black matrix formed as described above by spin coating and then dried in an oven for 3 minutes at 70° C. Subsequently, a photo mask was disposed at a distance of 100 μm from the coating film of the red curable resin composition and only the region corresponding to the region for forming the coloring layer was irradiated with ultraviolet light for 10 seconds using an ultra-high pressure mercury lamp of 2.0 kW by a proximity aligner.

Subsequently, the substrate was immersed in a 0.05 wt % aqueous solution of potassium hydroxide (liquid temperature of 23° C.) for 1 minute so as to perform the alkali development, and only the uncured part of the coating film of the red curable resin composition was removed. Thereafter, the substrate was allowed to stand for 30 minutes in an atmosphere of 180° C. to perform the heat treatment, thereby forming a red relief pattern (thickness of 2.0 μm) in the region for forming the red pixel.

Next, a green relief pattern was formed in the region for forming the green pixel using a green curable resin composition having the following composition by the same step as the red relief pattern formation.

Furthermore, a blue relief pattern was formed in the region for forming the blue pixel using a blue curable resin composition having the following composition by the same step as the red relief pattern formation, thereby forming the coloring layer consisting of three colors of red (R), green (G) and blue (B).

(Preparation of Blue Color Material 1)

In 30 mL of xylene, 15.2 g (60 mmol) of 1-iodonaphthalene manufactured by Wako Pure Chemical Industries, Ltd., 4.63 g (30 mmol; of norbornanediamine (NBDA) (CAS No. 56602-77-8) manufactured by Mitsui Chemicals In, 8.07 g (84 mmol) of sodium-tert-butoxide, 0.09 g (0.2 mmol) of 2-dicyclohexylphosphino-2',6'-dimethoxybiphenyl manufactured by Sigma-Aldrich Co., LLC. and 0.021 g (0.1 mmol) of palladium acetate manufactured by Wako Pure Chemical Industries, Ltd. were dispersed and allowed to react for 48 hours at from 130° C. to 135° C. After the reaction was completed, the resultant was cooled to room temperature and water was added thereto to extract. Subsequently, the resultant was dried over magnesium sulfate and concentrated, thereby obtaining 8.5 g (yield of 70%) of the intermediate 1 represented by the following Chemical Formula (1). The compound thus obtained was confirmed to be the intended compound by the following result of analysis.

MS (ESI) (m/z): 407 (M+H),

Elemental analysis value: CHN measured value (85.47%, 8.02%, 6.72%); theoretical value (85.26%, 8.11%, 6.63%)

Chemical Formula (1)

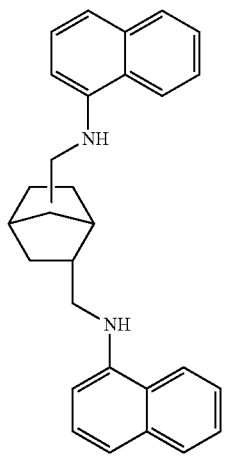

To 60 mL of toluene, 8.46 g (20.8 mmol) of the intermediate 1 and 13.5 g (41.6 mmol) of 4,4'-bis(dimethylamino) benzophenone manufactured by Tokyo Chemical Industry Co., Ltd, were added and stirred at from 45° C. to 50° C. To the mixture, 6.38 g (51.5 mmol) of phosphorus oxychloride manufactured by Wako Pure Chemical Industries, Ltd. was added dropwise, and the resultant was refluxed for 2 hours and cooled. After the reaction was completed, toluene was decanted. To the resinoid precipitate, 40 mL of chloroform, 40 mL of water and concentrated hydrochloric acid were added to dissolve, and the chloroform layer was separated. The chloroform layer was washed with water, dried ever magnesium sulfate and concentrated. To the concentrate, 65 mL of ethyl acetate was added and the resultant was refluxed. The precipitate was filtered after cooling, thereby obtaining 15.9 g (yield of 70%) of the blue color material 1 (BB7-Nb-dimer) represented by the following Chemical Formula (2).

The compound thus obtained was confirmed to be the intended compound by the following result of analysis.

MS (ESI) (m/z): 511 (+), 2-valent

Elemental analysis value: CHN measured value (78.13%, 7.48%, 7.78%); theoretical value (78.06%, 7.75%, 7.69%)

Chemical Formula (2)

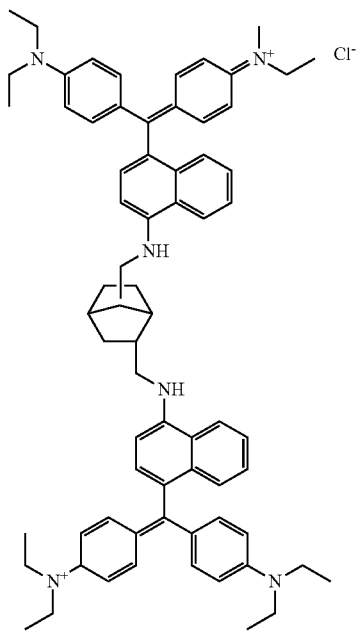

(Composition of Coloring Composition)

<Composition of Red Curable Resin Composition>

| | |
|---|---|
| C.I. Pigment Red 177: | 2 parts by weight |
| C.I. Pigment Red 254: | 4 parts by weight |
| Polysulfone acid type polymer dispersant: | 2 parts by weight |
| The curable resin composition: | 30 parts by weight (solid matter of 40%) |
| Acetate-3-methoxybutyl: | 80 parts by weight |

<Composition of Green Curable Resin Composition>

| | |
|---|---|
| C.I. Pigment Green 58: | 5 parts by weight |
| C.I. Pigment Yellow 138: | 1 part by weight |
| Polysulfone acid type polymer dispersant: | 2 parts by weight |
| The curable resin composition: | 30 parts by weight (solid matter of 40%) |
| Acetate-3-methoxybutyl: | 80 parts by weight |

<Composition of Blue Curable Resin Composition>

| | |
|---|---|
| The blue color material 1: | 5 parts by weight |
| Polysulfone acid type polymer dispersant: | 3 parts by weight |
| The curable resin composition: | 30 parts by weight (solid matter of 40%) |
| Acetate-3-methoxybutyl: | 80 parts by weight |

(Formation of Protective Film)

The curable resin composition was coated on the substrate having the coloring layer formed as described above by spin coating and dried to form a coating film having a dry film thickness of 2 μm.

A photo mask was disposed at a distance of 100 μm from the coating film of the curable resin composition and only the region corresponding to the region for forming the protective layer was irradiated with ultraviolet light for 10 seconds using an ultra-high pressure mercury lamp of 2.0 kW by a proximity aligner. Subsequently, the substrate was immersed in a 0.05 wt % aqueous solution of potassium hydroxide (liquid temperature of 23° C.) for 1 minute so as to perform the alkali development, and only the uncured part of the coating film of the curable resin composition was removed. Thereafter, the substrate was allowed to stand for 30 minutes in an atmosphere of 200° C. to perform the heat treatment, thereby forming the protective film.

(Formation of Spacer)

The curable resin composition was coated on the substrate having the coloring layer and the protective layer formed as described above by spin coating and dried to form a coating film. A photo mask was disposed at a distance of 100 μm from the coating film of the curable resin composition and only the region corresponding to the region for forming the spacer was irradiated with ultraviolet light for 10 seconds using an ultra-high pressure mercury lamp of 2.0 kW by a proximity aligner. Subsequently, the substrate was immersed in a 0.05 wt % aqueous solution of potassium hydroxide (liquid temperature of 23° C.) for 1 minute so as to perform the alkali development, and only the uncured part of the coating film of the curable resin composition was removed. Thereafter, the substrate was allowed to stand for 30 minutes in an atmosphere of 200° C. to perform the heat treatment, thereby forming the fixed spacer having an upper end portion area of 100 μm$^2$ and a height 3.0 μm at a predetermined number density.

(Fabrication of Liquid Crystal Panel)

A polyimide alignment layer was formed on the color filter obtained as described above. Subsequently, the required amount of IPS liquid crystal was dropped on a glass substrate on which a TFT had been formed, the color filter was superposed thereon and joined using a UV-curable resin as a sealing material by exposing at a dose of 400 mJ/cm$^2$ while applying a pressure of 0.3 kgf/cm$^2$ at room temperature, and the cell assembly was performed, thereby obtaining the liquid crystal panel.

(Fabrication of Light Emitting Device)

As the molded body, a resin molded body which contains titanium oxide and an epoxy resin and has a shape having a concave portion was used. In addition, the molded body used was integrally formed with a lead frame including copper plated with silver as the main material. As the blue light emitting element, a gallium nitride-based semiconductor light emitting element having the emission peak wavelength of 444 nm was used. After the blue light emitting element was disposed on the bottom surface of the concave portion of the molded body using a phenyl silicone resin as an adhesive, a pair of positive and negative electrodes of the blue light emitting element were connected to the lead frame, respectively by a gold wire. Next, the sealing member was formed by filling a resin cured product for sealing member having the following composition in the concave portion of the molded body and curing.

<Composition of Sealing Member>

| | |
|---|---|
| Silicone resin (main agent): | 100 parts by weight |
| The following red fluorescent substance: | 31.57 parts by weight |
| β-sialon: | 11.68 parts by weight |
| Filler (silica): | 5 parts by weight |
| Nanofiller (silica): | 0.4 part by weight |
| Curing agent (liquid silicons resin): | 400 parts by weight |

(Production Example 1 of Red Fluorescent Substance)

In order to have the charging composition ratio presented in Table 1, 21.66 g of $K_2MnF_6$ was weighed and dissolved in 800 g of a 55 wt % aqueous solution of HF, and then 400 g of a 40 wt % aqueous solution of $H_2SiF_6$ was added thereto, thereby preparing the solution A. On the other hand, 260.14 g of $KHF_2$ was weighed and dissolved in 450 g of a 55% aqueous solution, of HF to prepare the solution B. In addition, 200 g of a 40% aqueous solution of $H_2SiF_6$ was weighed to use as the solution C.

Next, the solution B and the solution C were simultaneously added dropwise to the solution A while being stirred at room temperature (23 to 28° C.) so as to continuously precipitate the fluorescent substance crystal (fluoride particles) and the dropwise addition was temporarily stopped at the stage at which 75% by weight of each of the solution B and the solution C was added dropwise as presented in Table 2 (first step).

As a reducing agent, 15 g of a 30% aqueous solution of $H_2O_2$ was weighed and added to the solution A (second step), the dropwise addition of the solution B and the solution C was restarted (third step). After the dropwise addition of the solution B and the solution C was completed, the precipitate thus obtained was separated, washed with IPA (isopropyl alcohol) and dried for 10 hours at 70° C., thereby fabricating the red fluorescent substance ($K_2[Si_{0.97}Mn^{4+}{}_{0.03}F_6]$) of Production Example 1. In the red fluorescent substance of the present Production Example 1, there was a region where the concentration of tetravalent manganese ion was low near the surface of the fluoride particles.

TABLE 1

| | Charged composition ratio (mol) | | | | Charged amount of solution A (g) | | | Charged amount of solution B (g) | | Charged amount of solution C (g) | Reducing agent (g) |
|---|---|---|---|---|---|---|---|---|---|---|---|
| | | | | | | 40% aqueous solution | 55% aqueous solution | | 55% aqueous solution | 40% aqueous solution | 30% aqueous solution |
| | K | Si | Mn | F | $K_2MnF_6$ | of $H_2SiF_6$ | of HF | $KHF_2$ | of HF | of $H_2SiF_6$ | of $H_2O_2$ |
| Production Example 1 | 2 | 0.95 | 0.05 | 6 | 21.66 | 400 | 800 | 260.14 | 450 | 200 | 15 |

TABLE 2

| | Proportion of dropwise addition before adding reducing agent (%) | |
|---|---|---|
| | Solution B | Solution C |
| Production Example 1 | 75 | 75 |

The light emitting device was obtained by the above procedure.
(Fabrication of Backlight Unit)
The light emitting device described above, a mounting substrate for mounting the light emitting device and a light guide plate were prepared. The light guide plate was fabricated by molding an acrylic resin into a plate shape. With regard to the mounting substrate, a copper foil was disposed on the surface of a glass epoxy resin to form a wiring pattern. The above light emitting device foil was disposed on the mounting substrate with solder. After mounting the light emitting device on the mounting substrate, the light extraction surface side of the light emitting device was disposed so as to face the light incident surface of the light guide plate, thereby the back light unit was fabricated.
(Fabrication of Liquid Crystal Display Device)
A diffusion sheet and a prism sheet were installed between the liquid crystal panel and the backlight unit and a driver IC was attached thereto, thereby fabricating a liquid crystal display device.

Example 2

A liquid crystal display device was fabricated in the same manner as in Example 1 except using the blue color material 2.
(Preparation of Blue Color Material 2)
In 50 mL of water, 0.433 g (0.18 mmol) of 12-molybdophosphoric acid and n-hydrate ("n" corresponds to 30) manufactured by Kanto Chemical Co., Inc. and 3.55 g (1.04 mmol) of 12-tungstophosphoric acid and n-hydrate ("n" corresponds to 30) manufactured by Kanto Chemical Co., Inc. were dissolved.
Thereto, 2.0 g (1.83 mmol) of the blue color material 1 (intermediate 2) dissolved in a mixed solvent of 50 mL of water and 100 mL of methanol was added, and the mixture was stirred for 1 hour at room temperature. The liquid obtained by the reaction was filtered under reduced pressure and washed with water. The cake was dried under reduced pressure, thereby obtaining the blue color material 2 having a molar ratio of molybdenum and tungsten of 14.6:85.4.

Example 3

A liquid crystal display device was fabricated in the same manner as in Example 1 except using the blue color material 3.

(Preparation of Blue Color Material 3)
The blue color material 3 having a molar ratio of molybdenum and tungsten of 0.4:99.6 was obtained in the same manner as the blue color material 2 except using 0.014 g of 12-molybdophosphoric acid and n-hydrate, and 4.15 g of 12-tungstophosphoric acid and n-hydrate.

Example 4

A liquid crystal display device was fabricated in the same manner as in Example 1 except using the blue color material 4.
(Preparation of Blue Color Material 4)
The blue color material 4 having a molar ratio of molybdenum and tungsten of 17.8:82.3 was obtained in the same manner as the blue color material 2 except using 0.577 g of 12-molybdophosphoric acid and n-hydrate, and 3.34 g of 12-tungstophosphoric acid and n-hydrate.

Comparative Example 1

The Basic Blue 7 (BB7) (manufactured by Tokyo Chemical Industry Co., Ltd.) was used as the blue color material and a red fluorescent substance was prepared in the same manner as in Production Example 1 except that the second step was not performed in Production Example 1 of the red fluorescent substance described above as the red fluorescent substance. A liquid crystal display device was fabricated in the same manner as in Example 1 except that the method of preparing the red fluorescent substance used in the light emitting device was changed.

Comparative Example 2

A liquid crystal display device was fabricated in the same manner as in in Comparative Example 1 except using a blue color material 5.
(Preparation of Blue Color Material 5)
In a mixed liquid of 50 mL of methanol and 50 mL of watery 1.62 g (50.2 mmol) of naphthalene-2,6-sulfonate 2 sodium manufactured by Tokyo Chemical Industry Co., Ltd. was dissolved by heating at from 50° C. to 55° C. and 5 g (97.3 mmol) of the Basic Blue 7 (CI-42595™ manufactured by Tokyo Chemical Industry Co., Ltd, was added thereto and stirred for 1 hour at the same temperature. Methanol in the solution was concentrated by an evaporator, 100 mL of water was added thereto, and the precipitate was filtered and washed with water. The cake was dried under reduced pressure, thereby obtaining 5.2 g (yield of 86%) of the blue color material 5 represented by the following Chemical Formula (5).

The compound thus obtained was confirmed to be the intended compound by the following result of analysis.
MS (ESI) (m/z): 478 (+), 143 (2−) (divalent)
Elemental analysis value: CHN measured value (73.12%, 6.77%, 6.86%); theoretical value (73.40%)

Chemical Formula (3)

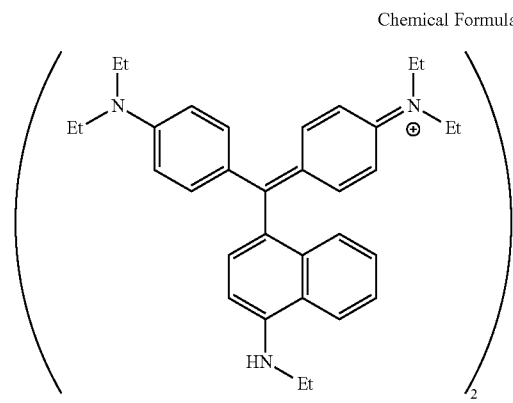

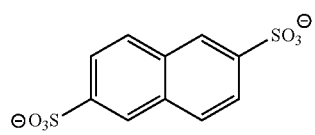

[Evaluation]

The liquid crystal display devices of Examples 1 to 4 and Comparative Examples 1 and 2 were subjected to the reliability test for light resistance by driving at 150 mA and allowing to still stand for 1000 hours at 25° C. The emission spectra of the liquid crystal display device before and after the test were measured by SR-UL1™ (manufactured by TOPCON CORPORATION). More favorable results were obtained in Examples 1 to 4 as compared with Comparative Examples 1 and 2 when the color shift of the WHITE coordinate and the NTSC ratio were compared. The results of the WHITE coordinate and the NTSC ratio are presented in Table 3, and each coordinate of red, green and blue before and after still standing is presented in Table 4 and Table 5. Incidentally, in Tables, the term "before imparting light resistance" indicates the measured value before the test and the term "after imparting light resistance" indicates the measured value after the test.

TABLE 4

| | Before imparting light resistance | | | | | | | | |
|---|---|---|---|---|---|---|---|---|---|
| | RED | | | GREEN | | | BLUE | | |
| | x | y | Y | x | y | Y | x | y | Y |
| Example 1 | 0.640 | 0.312 | 21.1 | 0.283 | 0.600 | 69.5 | 0.166 | 0.059 | 17.7 |
| Example 2 | 0.640 | 0.312 | 21.1 | 0.283 | 0.600 | 69.5 | 0.166 | 0.059 | 17.7 |
| Example 3 | 0.640 | 0.312 | 21.1 | 0.283 | 0.600 | 69.5 | 0.166 | 0.059 | 17.7 |
| Example 4 | 0.640 | 0.312 | 21.1 | 0.283 | 0.600 | 69.5 | 0.166 | 0.059 | 17.7 |
| Comparative Example 1 | 0.640 | 0.307 | 26.1 | 0.287 | 0.600 | 64.6 | 0.167 | 0.057 | 17.5 |
| Comparative Example 2 | 0.640 | 0.307 | 26.1 | 0.287 | 0.600 | 64.6 | 0.167 | 0.057 | 17.5 |

TABLE 5

| | After imparting light resistance | | | | | | | | |
|---|---|---|---|---|---|---|---|---|---|
| | RED | | | GREEN | | | BLUE | | |
| | x | y | Y | x | y | Y | x | y | Y |
| Example 1 | 0.635 | 0.312 | 19.9 | 0.280 | 0.598 | 70.2 | 0.165 | 0.057 | 18.1 |
| Example 2 | 0.635 | 0.312 | 19.9 | 0.280 | 0.598 | 70.2 | 0.166 | 0.060 | 17.8 |
| Example 3 | 0.635 | 0.312 | 19.9 | 0.280 | 0.598 | 70.2 | 0.165 | 0.058 | 18.2 |
| Example 4 | 0.635 | 0.312 | 19.9 | 0.280 | 0.598 | 70.2 | 0.167 | 0.062 | 20.2 |
| Comparative Example 1 | 0.630 | 0.307 | 23.5 | 0.282 | 0.600 | 66.3 | 0.191 | 0.105 | 36.4 |
| Comparative Example 2 | 0.630 | 0.307 | 23.5 | 0.282 | 0.600 | 66.3 | 0.176 | 0.078 | 24.3 |

REFERENCE SIGNS LIST

1 . . . transparent substrate
2 . . . coloring layer
2R . . . red coloring layer
2G . . . green coloring layer
2B . . . blue coloring layer
3 . . . light shielding portion
4 . . . color filter

TABLE 3

| | Before imparting light resistance | | | | After imparting light resistance | | | | Δ | | | |
|---|---|---|---|---|---|---|---|---|---|---|---|---|
| | x | y | Y | NTSC % | x | y | Y | NTSC % | x | y | Y | NTSC % |
| Example 1 | 0.260 | 0.223 | 36.1 | 71.7% | 0.252 | 0.216 | 36.1 | 71.1% | −0.006 | −0.007 | −0.02 | −0.8% |
| Example 2 | 0.260 | 0.223 | 36.1 | 71.7% | 0.257 | 0.226 | 36.0 | 70.6% | −0.003 | 0.002 | −0.12 | −1.1% |
| Example 3 | 0.260 | 0.223 | 36.1 | 71.7% | 0.253 | 0.218 | 36.1 | 70.9% | −0.007 | −0.005 | 0.01 | −0.8% |
| Example 4 | 0.260 | 0.223 | 36.1 | 71.7% | 0.252 | 0.218 | 36.8 | 70.3% | −0.008 | −0.005 | 0.67 | −1.4% |
| Comparative Example 1 | 0.273 | 0.217 | 36.1 | 71.7% | 0.273 | 0.237 | 42.1 | 62.6% | 0.000 | 0.020 | 8.02 | −8.8% |
| Comparative Example 2 | 0.273 | 0.217 | 36.1 | 71.7% | 0.269 | 0.229 | 38.1 | 67.2% | −0.004 | 0.012 | 2.00 | −4.5% |

5 . . . counter substrate
6 . . . liquid crystal layer
10 . . . liquid crystal cell unit
20 . . . backlight unit
21 . . . light emitting device
24 . . . blue light emitting element
27 . . . red fluorescent substance
28 . . . green fluorescent substance
30A and 30B . . . polarizer
100 . . . liquid crystal display device
220 . . . light guide plate

The invention claimed is:

1. A liquid crystal display device comprising:
a liquid crystal cell unit including a color filter having a transparent substrate and a plurality of coloring layers formed on the transparent substrate, a counter substrate and a liquid crystal layer formed between the color filter and the counter substrate; and
a backlight unit including a light emitting device having a blue light emitting element, and a red fluorescent substance and a green fluorescent substance, wherein
the plurality of coloring layers has a blue coloring layer containing a color material represented by the following General Formula (I), and
the red fluorescent substance is a fluorescent substance that is surface treated and represented by the following General Formula (II):

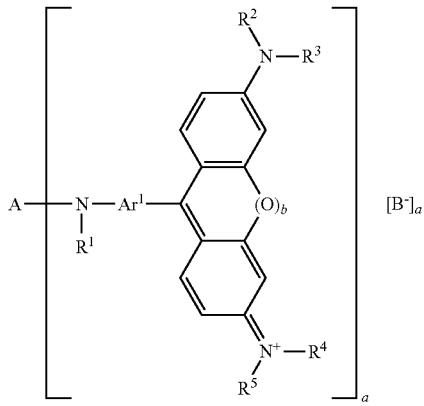

General Formula (I)

(in General Formula (I), A represents an a-valent organic group of which a carbon atom directly bonded to N does not have a π bond, the organic group represents an aliphatic hydrocarbon group having a saturated aliphatic hydrocarbon group at least at a terminal directly bonded to N or an aromatic group having the aliphatic hydrocarbon group and may contain O, S and N in a carbon chain; $B^-$ represents a monovalent anion, and a plurality of $B^-$ may be same as or different from one another; $R^1$ to $R^5$ each independently represents a hydrogen atom, an alkyl group which may have a substituent or an aryl group which may have a substituent, and $R^2$ and $R^3$, and $R^4$ and $R^5$ may bond to each other to form a ring structure; $Ar^1$ represents a divalent aromatic group which may have a substituent; a plurality of $R^1$ to $R^5$ and a plurality of $Ar^1$ may be same as or different from one another, respectively;

"a" represents an integer from 2 to 4; "b" represents 0 or 1, and there is no bond when "b" is 0; a plurality of "b" may be same as or different from one another), and $$M^1{}_2[M^2{}_{1-x}Mn^{4+}{}_xF_6]$$   General Formula (II)

(in General Formula (II) above, $M^1$ represents at least one kind selected from the group consisting of $K^+$, $Li^+$, $Na^+$, $Rb^+$, $Cs^+$ and $NH_4^+$, $M^2$ represents at least one kind selected from the group consisting of Group 4 elements and Group 14 elements, and "x" is 0<x<0.2).

2. The liquid crystal display device according to claim 1, wherein an activator agent concentration of the red fluorescent substance is 6 mol % or less.

3. The liquid crystal display device according to claim 1, wherein the light emitting device has a lead frame and is obtained by disposing the red fluorescent substance within 200 μm from a top surface of the lead frame.

4. A liquid crystal display device comprising:
a liquid crystal cell unit including a color filter having a transparent substrate and a plurality of coloring layers formed on the transparent substrate, a counter substrate and a liquid crystal layer formed between the color filter and the counter substrate; and
a backlight unit including a light emitting device having a blue light emitting element, and a red fluorescent substance and a green fluorescent substance, wherein
the plurality of coloring layers has a blue coloring layer containing a color material represented by the following General Formula (III), and
the red fluorescent substance is a fluorescent substance that is surface treated and represented by the following General Formula (II):

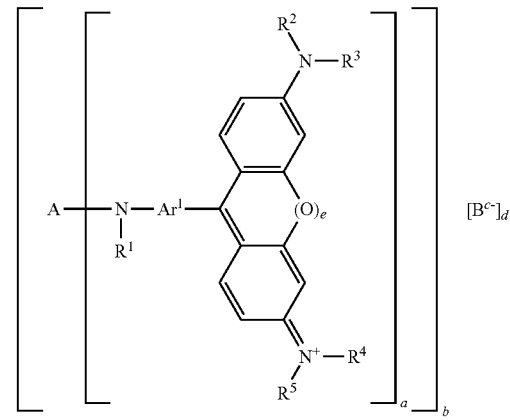

General Formula (III)

(in General Formula (III), A represents an a-valent organic group of which a carbon atom directly bonded to N does not have a π bond, the organic group represents an aliphatic hydrocarbon group having a saturated aliphatic hydrocarbon group at least, at a terminal directly bonded to N or an aromatic group having the aliphatic hydrocarbon group and may contain O, S and N in a carbon chain; $B^{c-}$ represents a c-valent anion; $R^1$ to $R^5$ each independently represents a hydrogen atom, an alkyl group which may have a substituent or an aryl group which may have a substituent, and $R^2$ and $R^3$, and $R^4$ and $R^5$ may bond to each other to form a ring structure; $Ar^1$ represents a divalent aromatic group which may nave a substituent; a plurality of $R^1$ to $R^5$ and a plurality of $Ar^1$ may be same as or different from one another, respectively;

"a" represents an integer from 2 to 4; "c" represents an integer of 2 or more, "b" and represent an integer of 1 or more; "e" represents 0 or 1, and there is no bond when "e" is 0; a plurality of "e" may be same as or different from one another), and $$M^1{}_2[M^2{}_{1-x}Mn^{4+}{}_xF_6] \quad \text{General Formula (II)}$$

(in General Formula (II) above, $M^1$ represents at least one kind selected from the group consisting of $K^+$, $Li^+$, $Na^+$, $Rb^+$, $Cs^+$ and $NH_4^+$, $M^2$ represents at least one kind selected from the group consisting of Group 4 elements and Group 14 elements, and x is 0<x<0.2.).

5. The liquid crystal display device according to claim 4, wherein the anion in General Formula (III) is a polyacid anion that contains molybdenum and tungsten and has a molar ratio of molybdenum and tungsten in the range of from 0.4:99.6 to 15:85.

6. The liquid crystal display device according to claim 4, wherein the anion in General Formula (III) is a polyacid anion that contains at least tungsten and has a molar ratio of molybdenum to tungsten of less than 0.4/99.6.

7. The liquid crystal display device according to claim 4, wherein an activator agent concentration of the red fluorescent substance is 6 mol % or less.

8. The liquid crystal display device according to claim 4, wherein the light emitting device has a lead frame and is obtained by disposing the red fluorescent substance within 200 μm from a top surface of the lead frame.

9. A method for manufacturing a liquid crystal display device, which manufactures a liquid crystal display device comprising
   a liquid crystal cell unit including a color filter having a transparent substrate and a plurality of coloring layers formed on the transparent substrate, a counter substrate and a liquid crystal layer formed between the color filter and the counter substrate, and
   a backlight unit including a light emitting device having a blue light emitting element, and a red fluorescent substance and a green fluorescent substance, the method comprising steps of:
   forming the color filter having a blue coloring layer containing a color material represented by the following General Formula (I); and
   forming the light emitting device wherein the red fluorescent substance is a fluorescent substance that is surface treated and represented by the following General Formula (II):

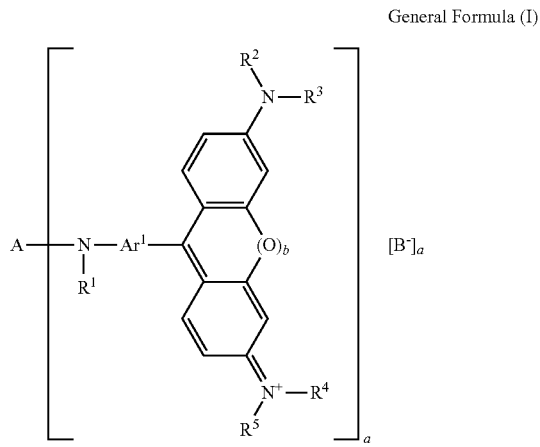

General Formula (I)

(in General Formula (I), A represents an a-valent organic group of which a carbon atom directly bonded to N does not have a π bond, the organic group represents an aliphatic hydrocarbon group having a saturated aliphatic hydrocarbon group at least at a terminal directly bonded to N or an aromatic group having the aliphatic hydrocarbon group and may contain O, S and N in a carbon chain; $B^-$ represents a monovalent anion, and a plurality of $B^-$ may be same as or different from one another; $R^1$ to $R^5$ each independently represents a hydrogen atom, an alkyl group which may have a substituent or an aryl group which may have a substituent, and $R^2$ and $R^3$, and $R^4$ and $R^5$ may bond to each other to form a ring structure; $Ar^1$ represents a divalent aromatic group which may have a substituent; a plurality of $R^1$ to $R^5$ and a plurality of $Ar^1$ may be same as or different from one another, respectively;

"a" represents an integer from 2 to 4; "b" represents 0 or 1, and there is no bond when "b" is 0; a plurality of "b" may be same as or different from one another), and $$M^1{}_2[M^2{}_{1-x}Mn^{4+}{}_xF_6] \quad \text{General Formula (II)}$$

(in General Formula (II) above, $M^1$ represents at least one kind selected from the group consisting of $K^+$, $Li^+$, $Na^+$, $Rb^+$, $Cs^+$ and $NH_4^+$, $M^2$ represents at least one kind selected from the group consisting of the Group 4 elements and the Group 14 elements, and "x" is 0<x<0.2).

10. A method for manufacturing a liquid crystal display device, which manufactures a liquid crystal display device comprising
   a liquid crystal cell unit including a color filter having a transparent substrate and a plurality of coloring layers formed on the transparent substrate, a counter substrate and a liquid crystal layer formed between the color filter and the counter substrate, and
   a backlight unit including a light emitting device having a blue light emitting element, and a red fluorescent substance and a green fluorescent substance, the method comprising steps of:
   forming the color filter having a blue coloring layer containing a color material represented by the following General Formula (III); and
   forming the light emitting device wherein the red fluorescent substance is a fluorescent substance that is surface treated and represented by the following General Formula (II):

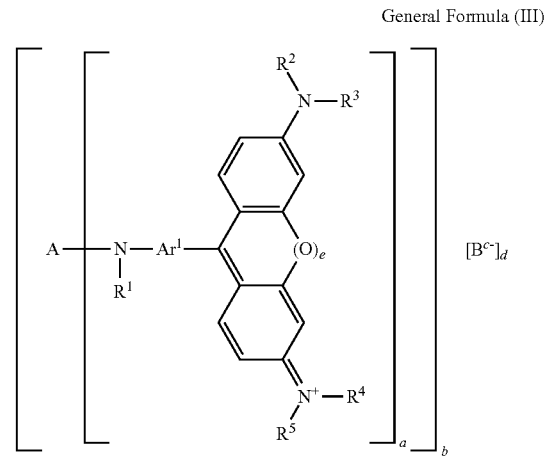

General Formula (III)

(in General Formula (III), A represents an a-valent organic group of which a carbon atom directly bonded to N does not have a π bond, the organic group represents an aliphatic hydrocarbon group having a saturated aliphatic hydrocarbon group at least at a terminal directly bonded to N or an aromatic group having the aliphatic hydrocarbon group and may contain O, S and N in a carbon chain; $B^{c-}$ represents a c-valent anion; $R^1$ to $R^5$ each independently represents a hydrogen atom, an alkyl group which may have a substituent or an aryl group which may have a substituent, and $R^2$ and $R^3$, and $R^4$ and $R^5$ may bond to each other to form a ring structure; $Ar^1$ represents a divalent aromatic group which may nave a substituent; a plurality of $R^1$ to $R^5$ and a plurality of $Ar^1$ may be same as or different from one another, respectively;

"a" represents an integer from 2 to 4; "c" represents an integer of 2 or more, "b" and "d" represent an integer of 1 or more; "e" represents 0 or 1, and there is no bond when "e" is 0; a plurality of "e" may be same as or different from one another), and $$M^1{}_2[M^2{}_{1-x}Mn^{4+}{}_xF_6] \qquad \text{General Formula (II)}$$

(in General Formula (II) above, $M^1$ represents at least one kind selected from the group consisting of $K^+$, $Li^+$, $Na^+$, $Rb^+$, $Cs^+$ and $NH_4^+$, $M^2$ represents at least one kind selected from the group consisting of Group 4 elements and Group 14 elements, and "x" is $0<x<0.2$).

* * * * *